United States Patent [19]
Allred et al.

[11] Patent Number: 5,765,142
[45] Date of Patent: Jun. 9, 1998

[54] METHOD AND APPARATUS FOR THE DEVELOPMENT AND IMPLEMENTATION OF AN INTERACTIVE CUSTOMER SERVICE SYSTEM THAT IS DYNAMICALLY RESPONSIVE TO CHANGE IN MARKETING DECISIONS AND ENVIRONMENTS

[75] Inventors: Scott K. Allred; Mike D. Helton; H. Matthew Russell, all of Las Vegas; William S. Stokes, North Las Vegas, all of Nev.

[73] Assignee: Creatacard, Cleveland, Ohio

[21] Appl. No.: 472,898

[22] Filed: Jun. 7, 1995

Related U.S. Application Data

[63] Continuation-in-part of Ser. No. 292,611, Aug. 18, 1994, abandoned.

[51] Int. Cl.$^6$ .................................................. G06F 153/00
[52] U.S. Cl. ................................................. 705/26; 395/701
[58] Field of Search ............................... 395/201–204, 395/226, 227, 154–157, 701, 613, 615, 333, 147; 340/825.33–825.35; 235/379–383; 364/474.2–474.22

[56] References Cited

U.S. PATENT DOCUMENTS

| | | | |
|---|---|---|---|
| 4,365,315 | 12/1982 | Jamnik | 364/900 |
| 4,598,378 | 7/1986 | Giacomo | 364/479 |
| 4,615,002 | 9/1986 | Innes | 364/419 |
| 4,994,912 | 2/1991 | Lumelsky et al. | 358/140 |
| 5,056,029 | 10/1991 | Cannon | 364/468 |
| 5,062,147 | 10/1991 | Pickett et al. | 364/900 |
| 5,225,977 | 7/1993 | Hooper et al. | 364/401 |
| 5,316,345 | 5/1994 | Madison | 283/117 |
| 5,412,712 | 5/1995 | Jennings | 379/88 |
| 5,544,320 | 8/1996 | Konrad | 395/200.09 |
| 5,576,951 | 11/1996 | Lockwood | 395/227 |

FOREIGN PATENT DOCUMENTS

| | | |
|---|---|---|
| 0564736 | 10/1993 | European Pat. Off. |
| 2682502 | 4/1993 | France. |
| 9316443 | 8/1993 | WIPO. |

OTHER PUBLICATIONS

PR NewsWire, p1108LAFNS002, New high-tech greeting card system offers advanced design (Custom Expressions Inc), Nov. 8, 1990, Dialog file 148, Acc. No. 04832408.

Newsbytes News Network, Two guys use PCS to start new greeting card FAD, Aug. 19, 1991, Dialog file 636, Acc. No. 01185092.

Patent Abstracts of Japan vol. 018 No. 441 (P–1788), 17 Aug. 1994 & JP.A.06 139265 (Toshiba Corp) 20 May 1994, see abstract.

*Primary Examiner*—Gail O. Hayes
*Assistant Examiner*—Frantzy Poinvil
*Attorney, Agent, or Firm*—Jones, Day, Reavis & Pogue

[57] ABSTRACT

A customer service system interface development tool is disclosed for use by an interface designer in creating an interface for customer interaction. The interface created by the development tool may be incorporated into a customer service system for presenting products or services to a customer for the customer to make a product or service selection if the customer so desires from the products or services presented as a result of the customer's interaction with the interface. The interface tool includes modules for specifying global parameters relating products or services to be presented to the customer through the interface and developing a profile of the customer service system environment in which the interface is to operate. An additional module aids the interface designer in planning a presentation by associating a set of presentation data with the products or services available for presentation to the customer. Optional modules includes modules for planning products for production at the same location as the customer service system embodying the interface. An example of use of the interface development tool in the greeting card environment is also disclosed.

15 Claims, 25 Drawing Sheets

Microfiche Appendix Included
(12 Microfiche, 2398 Pages)

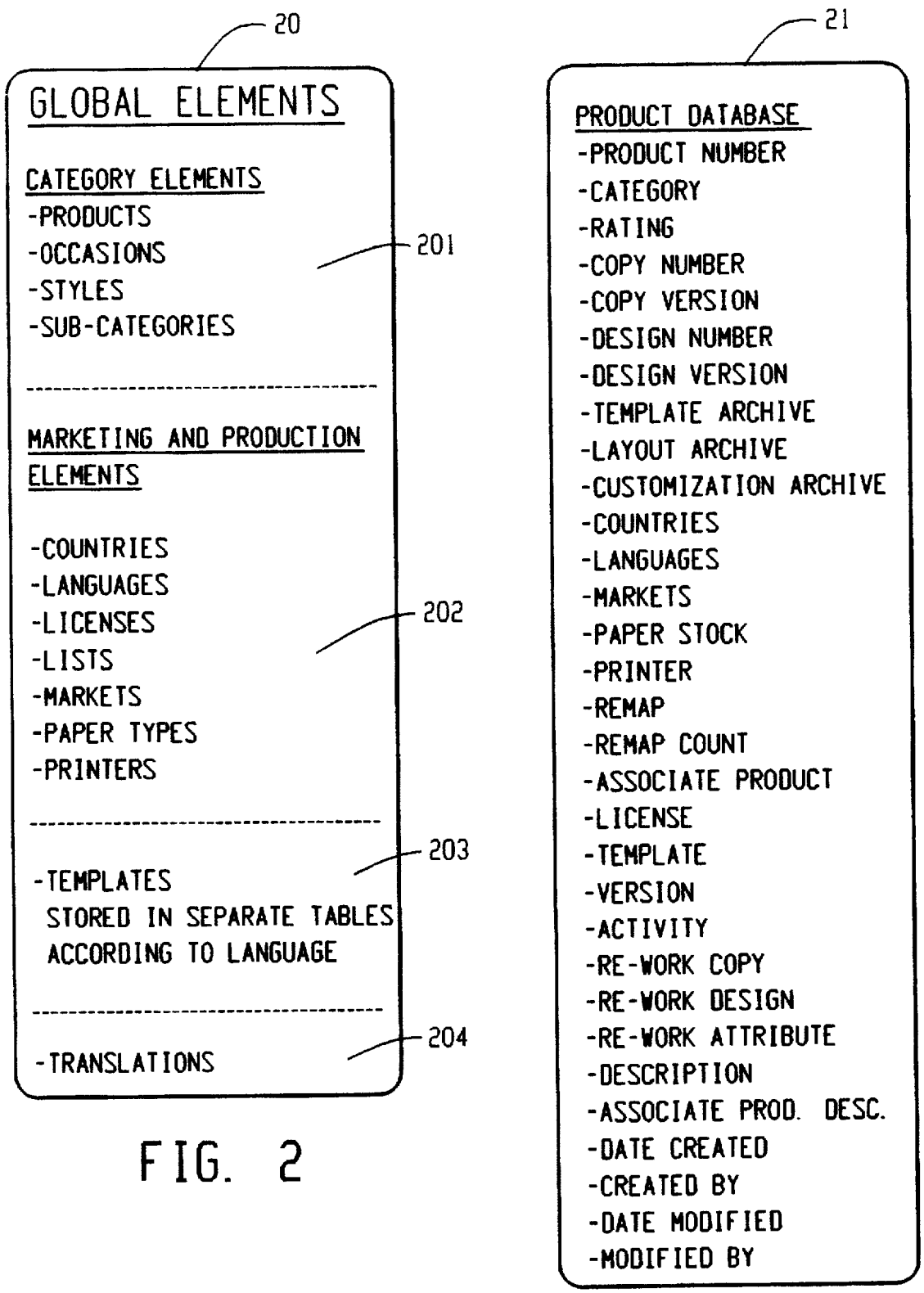

GLOBAL ELEMENTS

CATEGORY ELEMENTS
- PRODUCTS
- OCCASIONS
- STYLES
- SUB-CATEGORIES

MARKETING AND PRODUCTION ELEMENTS
- COUNTRIES
- LANGUAGES
- LICENSES
- LISTS
- MARKETS
- PAPER TYPES
- PRINTERS

- TEMPLATES
  STORED IN SEPARATE TABLES ACCORDING TO LANGUAGE

- TRANSLATIONS

FIG. 2

PRODUCT DATABASE
- PRODUCT NUMBER
- CATEGORY
- RATING
- COPY NUMBER
- COPY VERSION
- DESIGN NUMBER
- DESIGN VERSION
- TEMPLATE ARCHIVE
- LAYOUT ARCHIVE
- CUSTOMIZATION ARCHIVE
- COUNTRIES
- LANGUAGES
- MARKETS
- PAPER STOCK
- PRINTER
- REMAP
- REMAP COUNT
- ASSOCIATE PRODUCT
- LICENSE
- TEMPLATE
- VERSION
- ACTIVITY
- RE-WORK COPY
- RE-WORK DESIGN
- RE-WORK ATTRIBUTE
- DESCRIPTION
- ASSOCIATE PROD. DESC.
- DATE CREATED
- CREATED BY
- DATE MODIFIED
- MODIFIED BY

FIG. 3

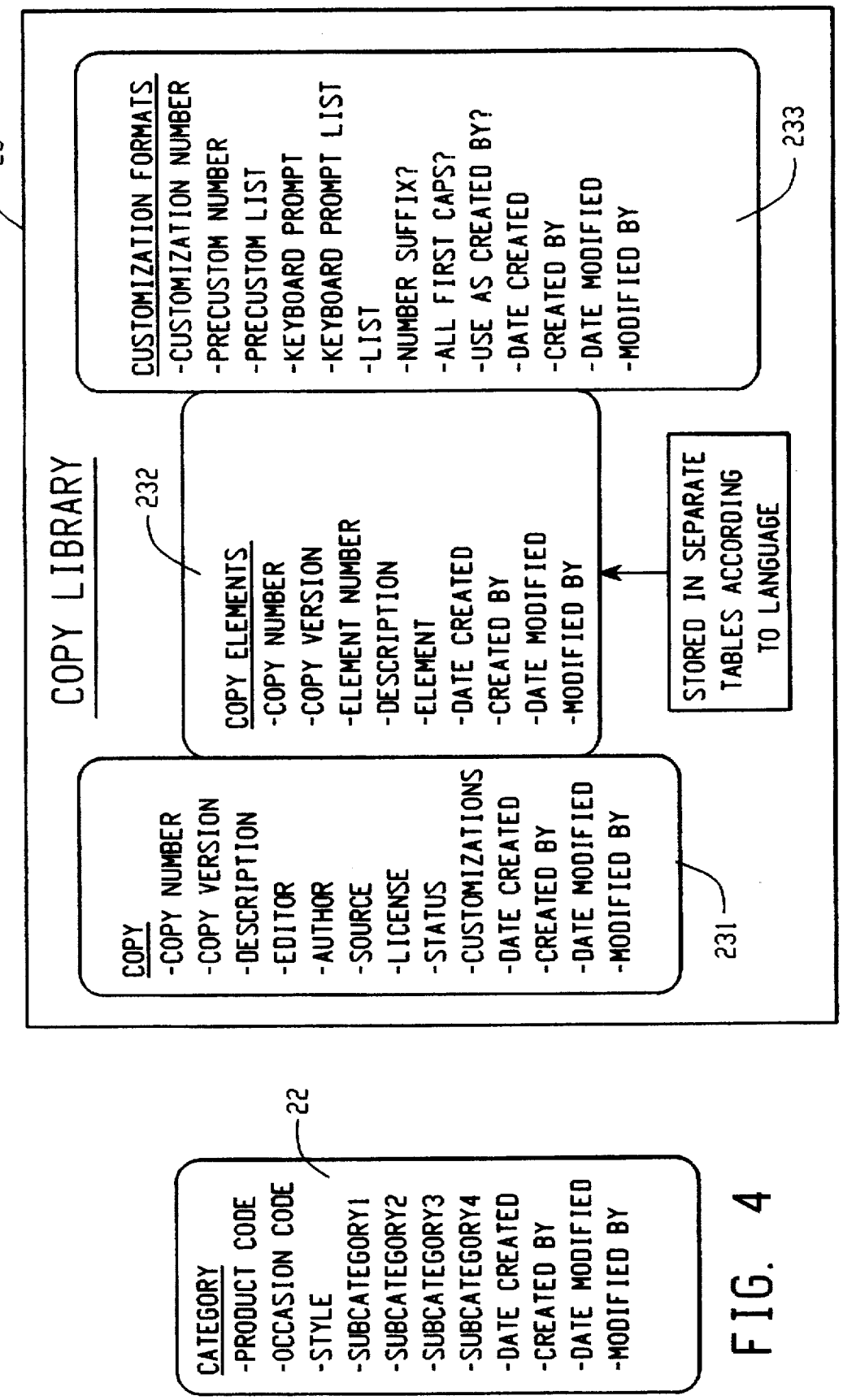

METHOD AND APPARATUS FOR THE DEVELOPMENT AND IMPLEMENTATION OF AN INTERACTIVE CUSTOMER SERVICE SYSTEM THAT IS DYNAMICALLY RESPONSIVE TO CHANGE IN MARKETING DECISIONS AND ENVIRONMENTS

This application is a continuation-in-part of U.S. patent application Ser. No. 08/292,611, filed Aug. 18, 1994, now abandoned and entitled "A Method and Apparatus for the Development and Implementation of an Interactive Customer Service System That is Dynamically Responsive to Changes in Marketing Decisions and Environments."

MICROFICHE APPENDIX

A microfiche appendix containing computer source code is attached. The microfiche appendix comprises 12 sheet(s) of microfiche, each sheet having 208 frames, except sheet 12 which has 110 frames, for a total of 2398 frames.

COPYRIGHT NOTICE

Portions of the disclosure of this patent document, including the microfiche appendix, contain material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF INVENTION

The invention relates to a method and apparatus for developing interactive customer service systems for the sale or display of products or services, wherein each such system is dynamically responsive to changed marketing conditions and consumer-indicated presentation preferences and each system is reconfigurable in light of the changed marketing conditions to present a selection of products or services that corresponds to the demographic and other marketing information developed through on-site use of the system.

BACKGROUND OF THE INVENTION

During the late 1980's and early 1990's, several computer-controlled vending systems were developed to enable the vending of greeting cards and related products. One such system that employs computer control of the vending process is represented by U.S. Pat. No. 5,056,472 issued to Buckley et al. and assigned to Hallmark Cards, Inc. The '472 patent describes a greeting card vending machine where stacks of different partially-printed cards are retrieved, personalized, and then dispensed to the customer. A computer keyboard is presented to permit the customer to select from among the available pre-printed card stock and to insert personal messages or information to personalize the card selected. In the embodiment set forth in the '472 patent, a robot-like structure, in conjunction with computer control, operates to deliver the selected pre-printed card from a physical storage area to a printer for the insertion of the personalized text and then to a delivery slot for retrieval by the customer. In one known commercial application of a machine similar to that disclosed in the Buckley '472 patent, Hallmark has provided for the selection of a pre-printed card directly by the customer from a standard greeting card display without the assistance of a robot-like mechanism. The customer delivers the card to a salesperson for insertion into a printer for the personalization in accordance with data previously presented by the customer through a keyboard or similar data entry device.

A different approach to computer-controlled vending of greeting cards and related products can be found in U.S. Pat. No. 5,056,029, issued to Cannon. The Cannon patent discloses a system in which greeting card and other related product designs are stored in digital form in a data base that is searchable by a customer through a touchscreen or other data entry device. The Cannon system guides the customer's selection of a graphic design to be incorporated into a product through a series of successive menus that result in the selection of parameters that describe the occasion or purpose for which the product is to be used, or that describe the age and gender characteristics of either the recipient of the product or the sender of the product. Based upon the customer's selection of these parameters, the system locates a selection of products that corresponds to the selected parameters and presents the selection on a CRT display for the customer to peruse and to select one product design for production. The final product is then printed on a plotter or a printer that is co-located with the CRT display and touchscreen through which the customer made his or her design selection. An additional feature of the Cannon system is an ability to transfer sales data from the vending location to a remote location.

These prior art systems along with other interactive point-of-sale and point-of-preview systems, although providing partial solutions to the need to automate the vending and production of products that are designed to meet consumer preferences, do not provide a method or apparatus for ensuring that changes in marketing strategies are reflected in the selections made available to the customers who use the systems. Nor do the prior art systems provide the capability to assist those involved in product development and marketing to assign certain properties to products to be marketed so that an efficient search strategy can be employed through an interface to the consumer that takes into consideration those properties.

In addition to the above listed shortcomings of prior art point-of-sale and point-of-preview systems, it is believed that no system has been developed to provide a system developer with a set of tools to produce an integrated customer service system with an interface that easily and dynamically is reconfigured to reflect changed marketing conditions or a change in the products or services to be offered through the customer service system without having to reprogram the software driving the interface. More specifically, it is believed that no presently available system exists that permits a kiosk interface designer or other interactive service provider to build and use a standardized, menu-driven interface to a customer service system, wherein the interface dynamically changes in response to a recognition of the time of year in which the interface is to be operated, or in response to the setting of parameters indicating the country or language in which the interface is to be operated, or in response to accumulated statistics on consumer preferences for particular services or products.

Accordingly, it is an object of the present invention to provide a method and apparatus for the development and implementation of an automatic system for the vending of products, wherein the automatic system is responsive to certain inputs which enable the system to change dynamically the products offered by the system so that the preferences of a particular consumer with respect to the products marketed are met.

It is a further object of the invention to provide a system that manages the marketing of certain products from the point at which the products are first conceived through the point that the products are selected by the consumer.

Still another object of the invention is to provide a dynamic user interface for a system for on-site production and vending of products wherein the user interface may be dynamically modified to take into consideration the languages spoken in the region served by the system or other demographic traits associated with the likely users of the system.

Another object of the invention is to provide a management system that enables the production of a vending system that can be easily modified to accommodate new products, new market segments, new languages, and new methods of on-site production of such products.

A further object of the invention is to provide a vending system that presents a consumer with an interface that includes visual and nonvisual controls and a keyboard on a touchscreen and that permits the consumer to choose, through "on the fly" translation, the language displayed on the visual controls as well as the keyboard layout associated with the displayed language.

Additional objects, advantages and novel features of the invention will be set forth in the description that follows. Other objects, advantages and novel features will become apparent to those skilled in the art who examine the description of the invention or through the practice of the invention as set forth below.

SUMMARY OF THE INVENTION

In achieving these and other objects, a method and apparatus has been provided for developing customer service systems for the marketing of products, wherein each such system is adaptable to the marketing environment in which the customer service system is to be deployed or to reflect a particular marketing emphasis within that environment, and further wherein each such customer service system is dynamically responsive to changes in that marketing environment. The method and apparatus according to the invention describe essentially a "metasystem"—a system for producing or "authoring" other systems, particularly multimedia customer service systems for the marketing of products and services that are to be selected in light of certain preferences or product characteristics specified by a consumer. Such a customer service system may also permit a consumer to specify modifications or customizations to the product he or she selects through the system, and, if appropriate, the system may also play a role in managing the production of the selected product, either on-site or at a remote production location.

Several software modules in combination with several types of hardware suites or stations perform various functions within the metasystem. For ease of description, but without limiting the generality of the invention, the metasystem shall be set forth in reference to the production of customer service systems or kiosks for the on-site production and sales of greeting cards, invitations, banners, posters, announcements, wrapping paper and like products. It should be appreciated by one of ordinary skill in the art that the metasystem described in greater detail below has application in designing any system for interaction with consumers of services, products or information in which a consumer is asked or directed through a series of menus to select, preview and/or purchase a product or service that meets the consumer's specifications, or simply to provide or receive information, such as in a customer preference survey system or an information directory kiosk. It should further be appreciated by one of ordinary skill in the art that a customer service system produced by the metasystem need not reside on or be provided through a customer services terminal or kiosk, but that such systems may operate through an interactive cable television system, an on-line information system such as CompuServe© or Prodigy©, or through an enhanced telecommunications service. It should also be appreciated that although the preferred embodiment contemplates that the customer service system produced by the metasystem will fulfill the customer's service or product purchase request proximate to the terminal through which the customer made his or her preferences known, remote fulfillment of the customer's request can also be accomplished through such a customer service system in accordance with the invention.

BRIEF DESCRIPTION OF THE DRAWINGS

The foregoing summary as well as the detailed description of the invention that follows are presented by way of example and are not intended to limit the present invention solely to the embodiments described therein. Other objects, features and aspects of the invention will be best appreciated by one of ordinary skill in the art when the description of the invention is viewed in conjunction with the accompanying drawings briefly described as follows:

FIGS. 2–8 are representations of the various tables, databases and other data sources referenced in the flow diagram of FIG. 1.

DETAILED DESCRIPTION OF PREFERRED EMBODIMENT

Figure 1A:
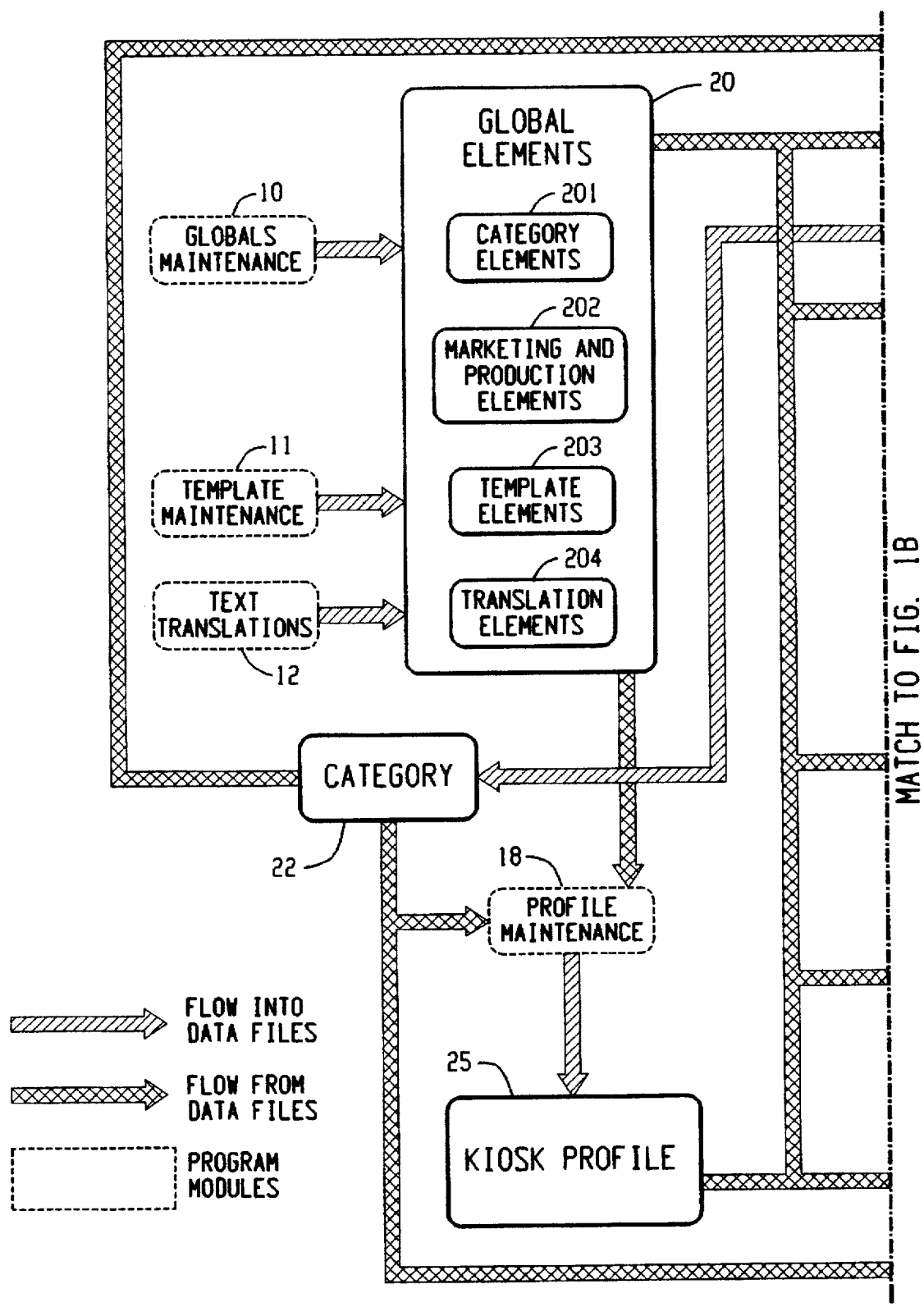
FIGS. 1A–1B is a data flow diagram of one of the preferred embodiments of the invention.
Figure 1B:
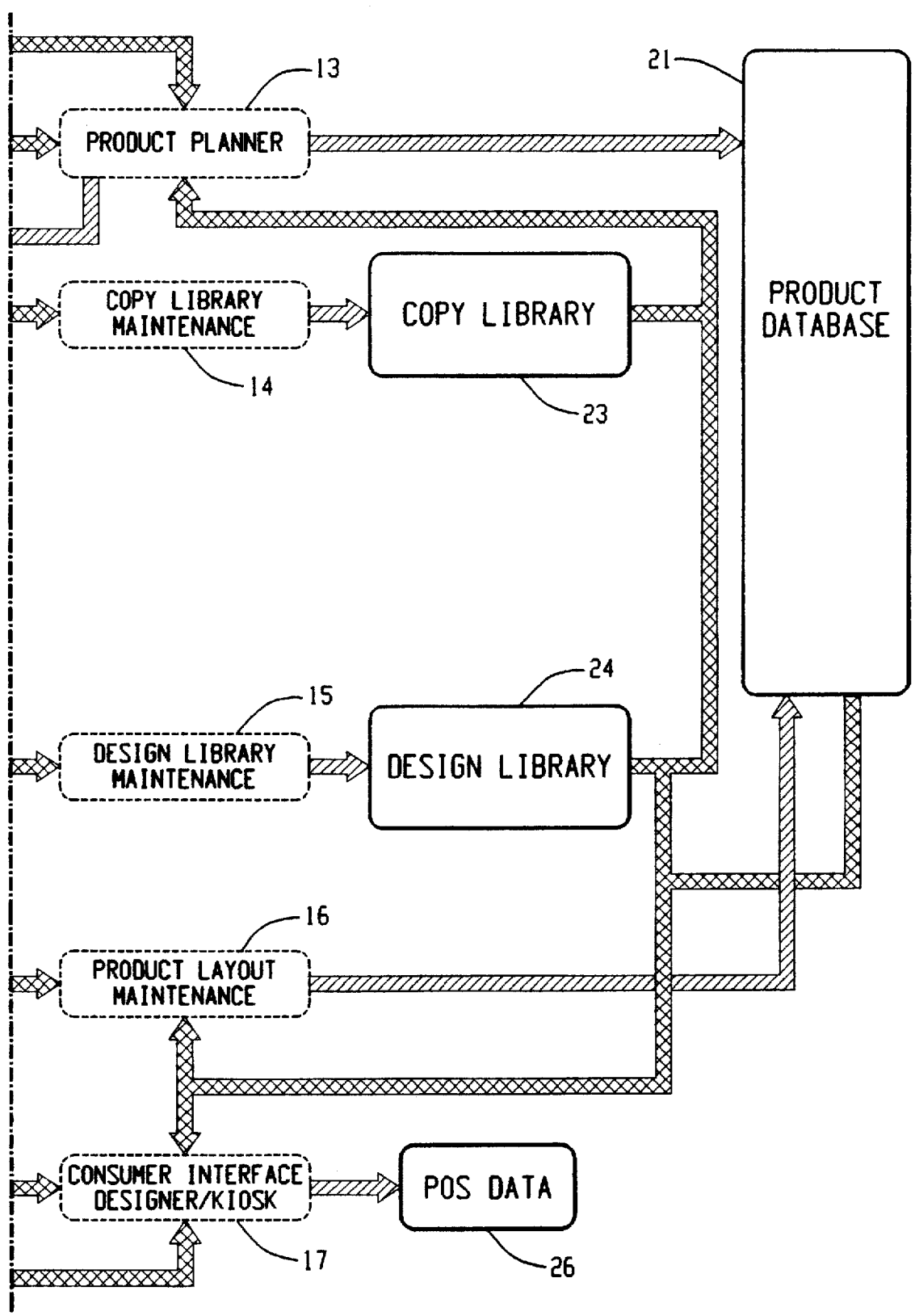
Figure 8:
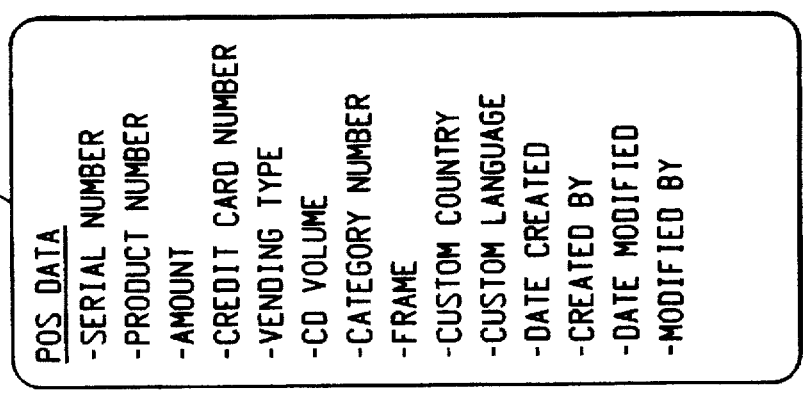
Figure 7:
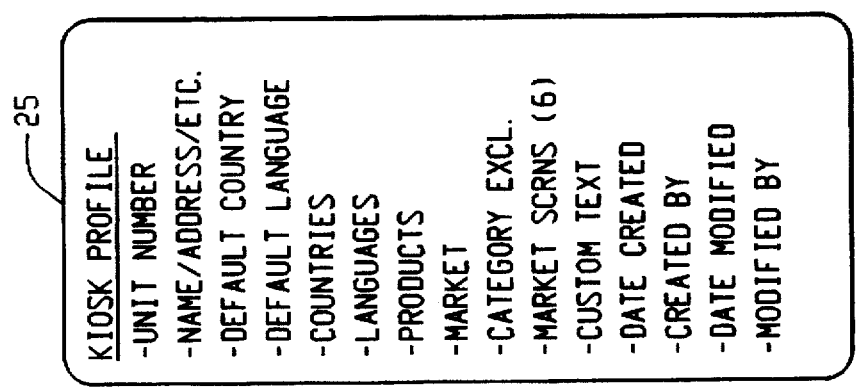
Figure 6:
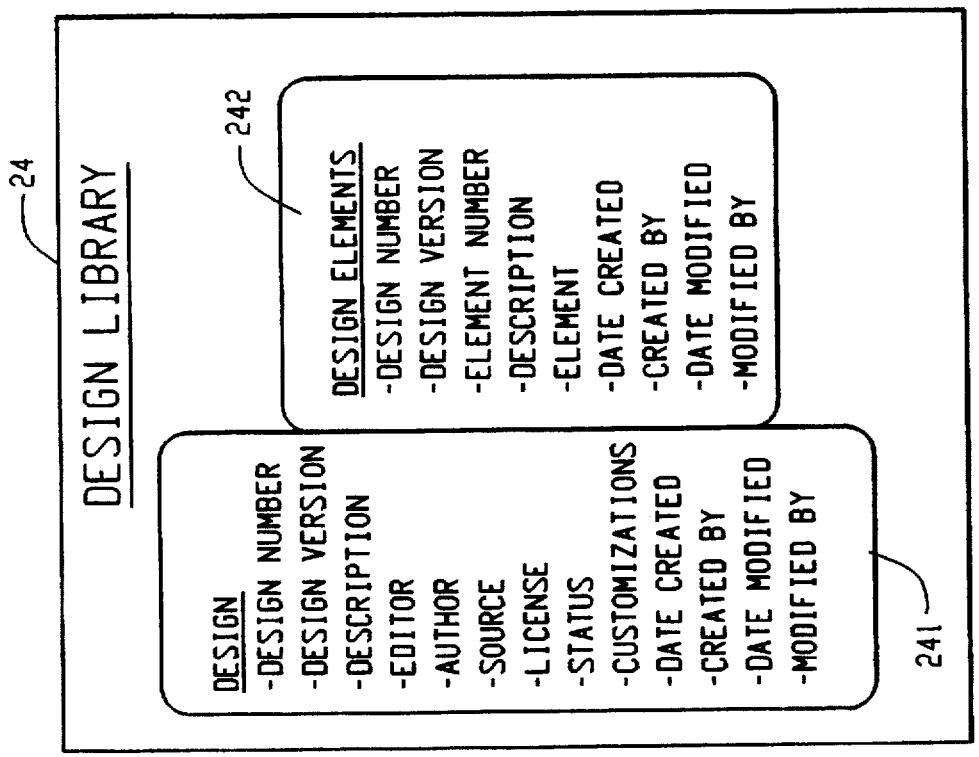

In the preferred embodiment, the metasystem can be described logically as consisting of nine software modules and a number of associated data files. For ease of description, the modules shall be referred to, as in FIGS. 1A–1B and FIGS. 2–8, as the Globals Maintenance Module (10); Template Maintenance Module (11); Text Translations Module (12); Product Planner Module (13); Copy Library Maintenance Module (14); Design Library Maintenance Module (15); Product Layout Maintenance Module (16); Profile Maintenance Module (18) and Consumer Interface Designer/Kiosk Module (17). Each software module listed above resides, in the preferred embodiment, the test and development unit and art work stations, while on field only the Kiosk version of the Consumer Interface Designer/Kiosk Module (17) will reside.

The customer service system produced by the metasystem according to the invention can be described from any point in the production process, but for ease of description will be described from the point a new product is conceived to the point a field unit embodying a customer service system is placed into operation. At the first stage of the invention, a new product line is conceived. For purposes of illustration, and without limiting the generality of the invention, the example of a system used to produce and market, through a consumer interface, a line of posters celebrating "European Unity Day" is used. During this stage, the Globals Maintenance Module is used to modify the Globals Elements (20) comprising the Category Elements (201) and the Marketing and Production Elements (202) to include information about the new product line that may be shared with other modules. The Globals Maintenance Module (10) could be used in this example, through an associated dialog box to specify what countries will be available to the interface designer. The administrator of the metasystem might want to restrict, in this instance, the interface designer to interfaces only for all the European Union countries. The information supplied is stored in a Countries database associated with the invention under the table Countries in the manner shown in Table VI (Each Table included in this application has 5 columns; Column 1 indicates whether a variable is used by another table—PK is a public key which indicates global access. FK is a foreign key, such variables are accessed by other defined data structures, and no symbol means the variable is local; Column 2 is the name of the variable; Column 3 is the variable type; Column 4 is the variable size; and Column 5 is a description of the variable if necessary). The administrator can also choose to add the main languages spoken in the European Union countries to a Languages Database through a similar dialog box. Those language names are stored under the table Languages in the manner shown in Table IX. The administrator could also specify the type of keyboard layout associated with each language through the same dialog box.

To a ProductData Table, the administrator may add through a dialog box the product Posters and parameters defining what a poster product is. This data is stored in the manner shown in Table XVIII. As can be seen in this table, a number of data are associated with the product through dialog boxes, either globally or with respect to a particular instance of the metasystem's operation, such as the instructions for laying out the product, the countries in which the product is "visible," i.e., where it will be permitted by to marketed through the interface developed by the interface designer, the languages that the product will be visible in, etc. The name of the product is stored as well in the Products Table as set forth structurally on Table XIX.

The administrator can similarly add "European Unity Day" to the Occasions Table in the structure shown in Table XV and can add poster stock to the "PaperTypes" data base, the structure of which is set forth in Table XVI. Although in the preferred embodiment it is envisioned that data entry occurs through dialog boxes that are preprogrammed as a part of the global maintenance module (10) in the manner represented by the source code found in the microfiche appendix, it would be well appreciated by one of ordinary skill in the art that any manner of placing data in a database can be used to establish the global parameters available to an interface designer.

In addition to each of these modifications, other items in the metasystem data base may similarly be established globally. These include the types of printers available through the Printer Table (see Table XVII), licenses to characters appearing on products and designs through a Licenses Table (see Table IX), markets to which particular products are to be marketed through a Markets Table (see Table XIV). Other items which may be established or modified through the Globals Maintenance Module include the line list for list of products to be marketed (Table XI), text lists for use in displays and in all other areas in which the metasystem uses lists of several items (Table XII) and the names associated with such lists (see Table XIII).

After the Category Elements and the Marketing and Production Elements have been modified, at the second stage of the invention a new product template is created through the Template Maintenance Module (11). Through this module, the user specifies the paper size, the paper type, the printer selection, the paper orientation, a record of the dividing lines or folds associated with the particular product type for which a template is to be developed, as well as whether the product is to be printed in color or black and white. To continue with the example of a poster product, the paper size might be set as "poster size", the paper type might be set as "poster stock", the printer selection might be set as a plotter (such as a Hewlett-Packard HP 7550 plotter), the paper orientation might be set as "landscape", the color/black and white selector might set to "color" and the record of dividing lines or folds might be set to "None". Thus, a new product template for a poster product line such as a "European Unity Day" poster product line is created through the Template Maintenance Module (11) and added to the Template Elements Database (203). The structure of the data records for the Product Template data is shown on Table XXIV.

It should be appreciated, however, that a product design may require more than one template. If, for example, both single sided and double sided posters are to be included in a product line, then one template may include a value indicating duplex printing, while another may include a value indicating one sided printing. It should be appreciated that templates that are added to the Template Elements database are independent of the product that required their creation. In other words and by way of example, once one template is created for a European Unity Day Poster, such a template may be globally referenced by the metasystem for use with another poster product for a different market such as an NFL Team poster or a World Cup Soccer Poster.

Once a product template or multiple templates are developed for a particular product line, at the next stage of the invention the Text Translations Module (12) is used to prepare translations for various text elements contained in the Lists dataset that are used by the customer service system either in the displays that are presented to the consumer or in the creation of the product that is to be marketed to the consumer. As with the templates prepared through the Template Maintenance Module, the need to prepare the translations may have been prompted by the introduction of a new product or product line, but they stand independent of such products and, once specified, may be used globally by the metasystem to accommodate other products or in the development of the display portion of other customer service systems. In the preferred embodiment, for each language specified in the Languages Table, a table of Translation Elements is developed through the Text Translations Module. The storage of text translations on an element basis can be seen in reference to the CopyLangx Table whose data structure is disclosed in Table IV.

After the text translations have been entered into the Translations dataset, Product Planner Module (13) may be invoked. Through this module, all the properties of a product as well as codes associated with the product are assigned in the Product Database. In the first part of the use of the module, the appropriate marketing personnel may specify a number of aspects of the product such as its product number, its description, the occasions for which the product is appropriate, the countries in which the product will appear and the languages the product copy is written in, any licenses under which the product is produced, other products that may be associated with the product and the template associated with the product. Also, the marketing personnel might specify the printer to be used for the production of the product as well as the date the product was first entered into the system. In the second part of this stage, the appropriate creative personnel may determine what copy and designs are to be associated with the product, which, as described below, are supplied as the Design Number and Version contained in the Design Library (24) and the Copy Number and Version from the Copy Library (23). Thus, through the Project Planner Module, a product record is created to designate the basic characteristics of a product. This record, once complete, is then passed to the Product Layout Module (16). As can be seen in Table XVIII, the ProductData database structure brings together a number of parameters and data to describe the products.

If, in the prior stage, neither copy nor a design is available to be assigned, then in the next stages the copy and the design to be associated with a particular product will be stored and organized by the respective Copy Library Maintenance and Design Library Maintenance Modules. Through each of the respective Library Maintenance Modules a unique Copy Number and a unique Design Number is obtained to complete the basic record in the prior stage. Copy identification is stored in the Copy Table whose structure can be found at Table III and a similar table for Designs can be found at Table VII.

It should be noted at this juncture that the Copy Library Maintenance Module (23) also permits the editing of the copy to be included on the product. Copy editors may use the module to divide the copy into logical parts, which constitute elements of the copy. This division permits storage of the copy with its associated customization, if any, and with the customer prompt that initiates the customization sequence with the customer through the Consumer Interface Designer/Kiosk Module (17) as is described in greater detail below. Text translations and text personalization elements ("CopyCustomization") are also developed through the Copy Library Maintenance Module. These items are stored in the metasystem database in the structures set forth in Tables IV and V. As can be seen from each table, the text elements (copylangx) and the personalizations are associated with a compound key with the appropriate element in the Copy database.

The Design Library Maintenance Module (24) also permits a limited form of editing in that it allows a design to be comprised of several different art files. Thus, each design record associated with a Design Number and a unique Design Version may include one or more Design Elements, where each Design Element record includes, among other items, the file name of the Design Element, its file path and a brief description of the Design Element. The "DesignElements" are stored as shown in Table VIII. An alternative embodiment of the invention would permit the use of the Design Library Maintenance Module in conjunction with commercially available design creation software to create directly the art files, rather than simply to store and manage them.

Once copy and design elements have been associated by the Product Planner Module, in the next stage the Product Layout Module (16) is used to create a final product file for viewing and production. From the Product Database (21), the copy and designs specified for a particular product become available for display in a WYSIWYG ("What you see is what you get") format. Through the use of this module, a layout artist may take each of the copy and design elements and prescribe the size and position of each element, and with respect to the copy elements, may also specify the font, color, justification and rotation of the copy, as well as setting parameters specifying the limits to which a consumer may customize the copy. It is during this stage that the final product design may be assigned to an appropriate printing device for viewing in printed form. The layout artist may optionally have pertinent product statistics printed on the print test version of the product.

At this point, the product specification, design, development, testing and production in electronic form of a new product are complete. In the next stage of the invention, profiles of the customer service systems or "kiosks" through which the product is to be marketed are developed through a Profile Maintenance Module (18). This module permits the specification in a Kiosk Profile (25) database of the characteristics of the kiosk or kiosks through which a customer will be able to obtain a particular product. Among the items specified in the Kiosk Profile database (25) are the countries, languages, products, markets and categories that the kiosk is set up to support, as well as default language and country. The "Profiles" data structure can be found by reference to Table XX. Additionally, the Profile Maintenance Module (18) may be used to specify the marketing frames in the consumer interface that will run prior to the initiation of a product selection menu sequence, and the category of products (Tier Level) that are to be excluded from display by the kiosk.

Once the Kiosk Profiles are complete, a Consumer Interface is then designed or modified to accommodate a new product or products. For purposes of illustration only, and not intending to limit the general application of the invention, at this stage the Consumer Interface Design/Kiosk Module (17) is used to design and maintain a touch screen-based kiosk Consumer Interface for the marketing of the products previously developed through the other modules. In general, the module is designed to permit one Consumer Interface to serve all markets, languages, times and geographic regions. This module is specifically designed to permit "on-the-fly" translation of customer touch screen options, keyboard layout and blocks of copy used in the product designs.

To serve as a dynamic, flexible marketing tool, the module permits variations in what is displayed to the consumer through a series of "frames" by the judicious application of "smart" controls—visual and nonvisual elements that are individually programmed to appear or disappear or to be active or inactive at a certain time or in a certain sequence and with which may be associated functions to be performed when the control is actuated. FIGS. 13, 14A–14B and 15–22 illustrate in greater detail through a flow chart how the Consumer Interface Designer/Kiosk Module operates in the instant invention.

Types of controls that may be placed on a touch screen frame include pictures (such as static graphic files, animation or videos), smart buttons, corrals (which define the spaces in which certain smart buttons or lists of text may appear), keyboards and text. Other controls which may be associated with a particular frame or frames or other controls include vending, sound and timing controls and product display controls. Each control is "smart" in that the function it performs or the manner or sequence in which the function is performed may be made dependent upon the kiosk profile associated with a particular kiosk where the interface is employed. In this manner, for example, the same interface may be used in the United States to display products associated with the Fourth of July, and yet alter itself based upon a different Kiosk Profile to enable French consumers to obtain products relating to Bastille Day or to display Cinco de Mayo products to Mexican consumers.

This ability to "mutate" is a key feature of the Consumer Interfaces capable of being designed by the Consumer Interface Designer/Kiosk Module. As will be described more fully below, the various controls can be programmed through the module to appear or become active when they are needed and to disappear or remain dormant when they are not. Thus, by way of example, a button for the display of Thanksgiving products may be programmed to appear if a kiosk profile specifies a market that includes Canadian and American consumers but to remain invisible in markets in which Thanksgiving is not a holiday that is celebrated. Extending this example further, the profile of a kiosk in Quebec may specify the display of Thanksgiving products in both French and English up through the October celebration of Canadian Thanksgiving, in accordance with which a smart button will know to appear at a specified time before the celebration, but to disappear immediately after the holiday. A similar kiosk in Buffalo, N.Y. might have a profile that specifies a relevant market for both American and Canadian Thanksgiving products for both French and English-speaking recipients. Thus, for such a kiosk, a smart button would appear prior to the Canadian Thanksgiving that permits the consumer to select Canadian Thanksgiving products, and a few weeks later another smart button would appear to permit the selection of American Thanksgiving products. After the Canadian Thanksgiving has passed, the first smart button would disappear, but the second smart button would remain until the American Thanksgiving Day after which it would similarly disappear.

As previously indicated, sound and animation controls may be associated with a particular frame or control in order to attract consumers or to make the product selection process more interesting. Thus, by way of example, a Fourth of July smart button, when depressed, may initiate the sounds of fireworks accompanied by a series of animated explosions.

Figure 13:
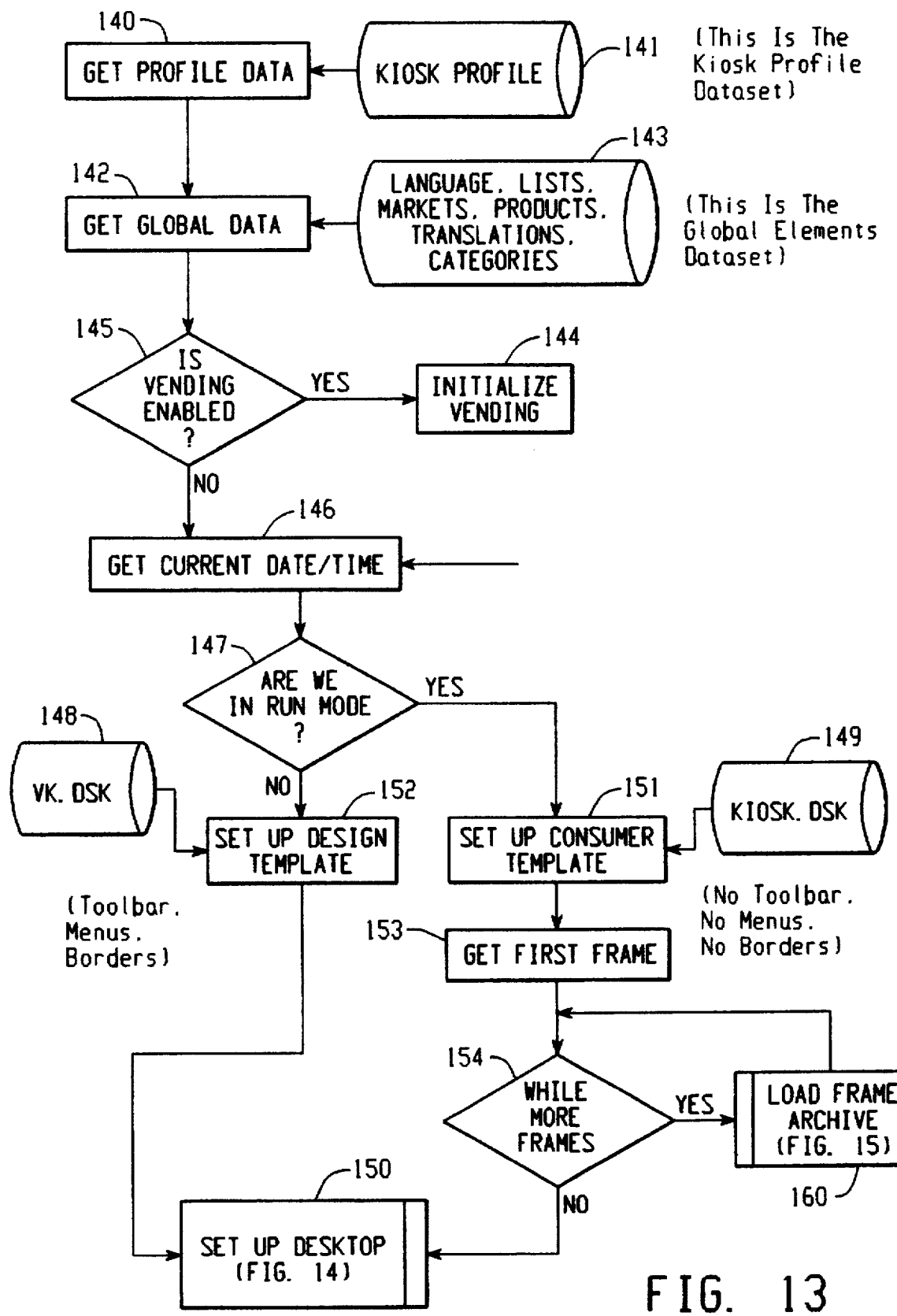
FIGS. 13, 14A–14B and 15–22 comprise the main software module for the design and execution of Consumer Interfaces.
Figure 14A:
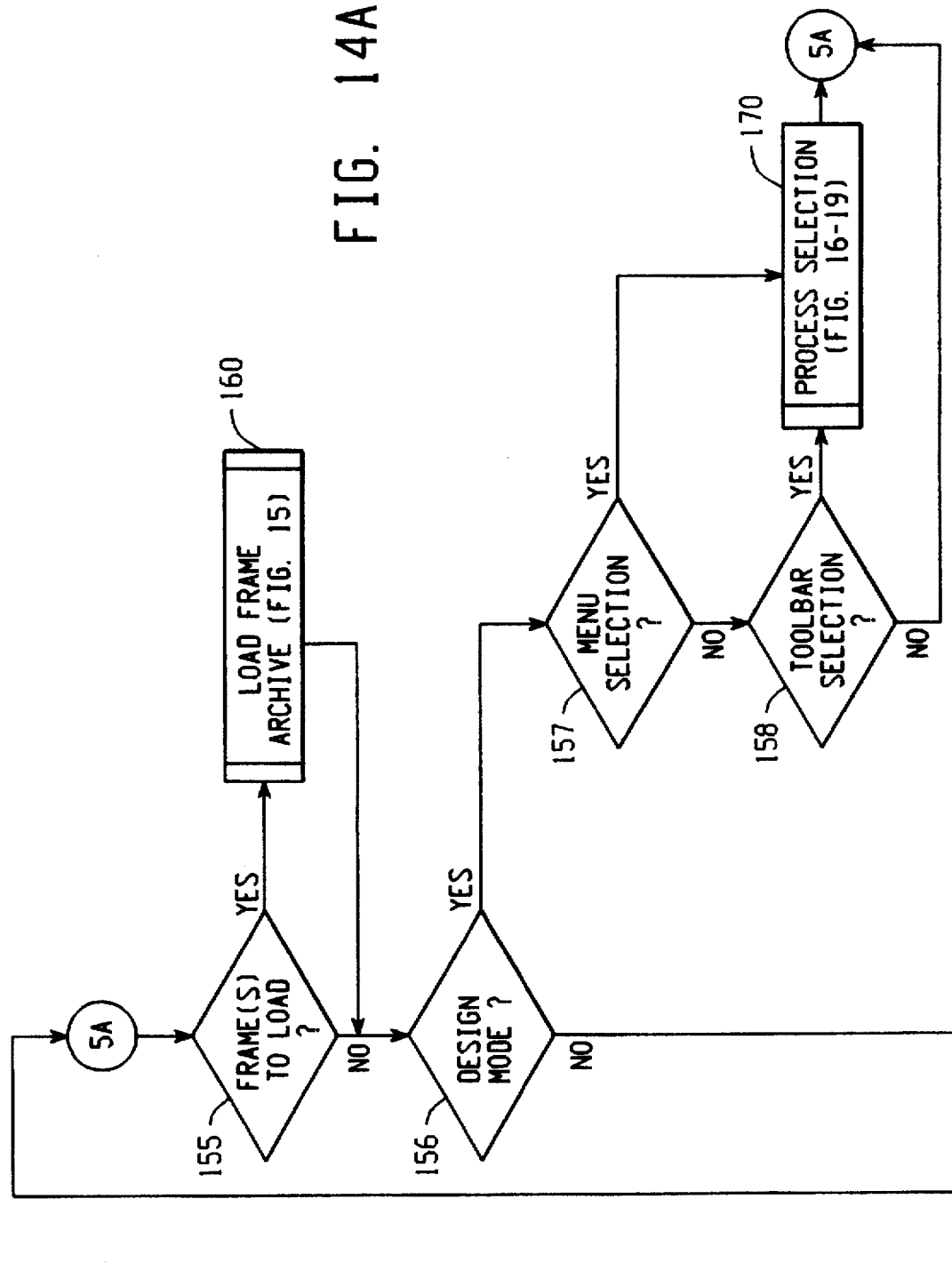
Figure 14B:
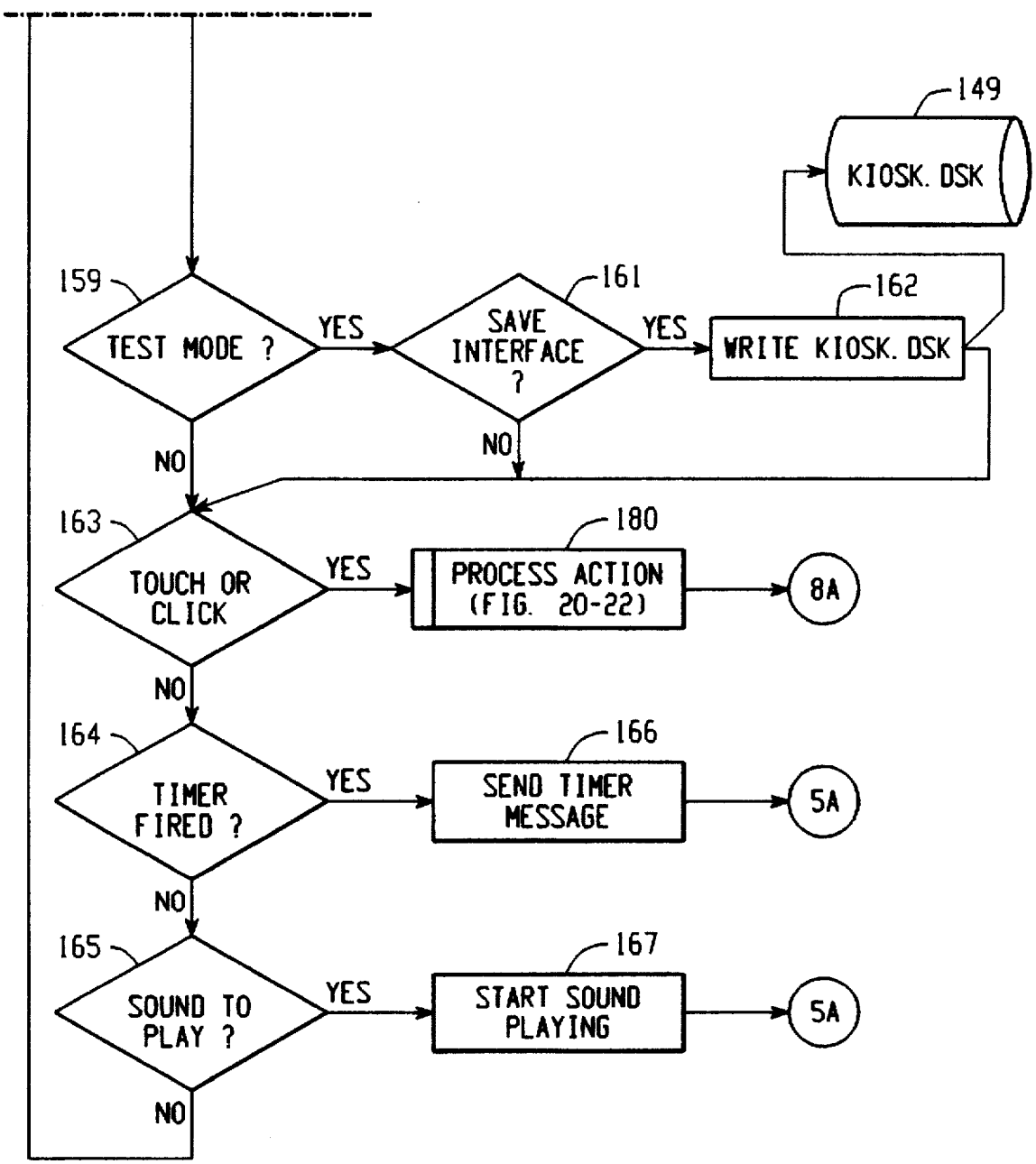
Figure 15:
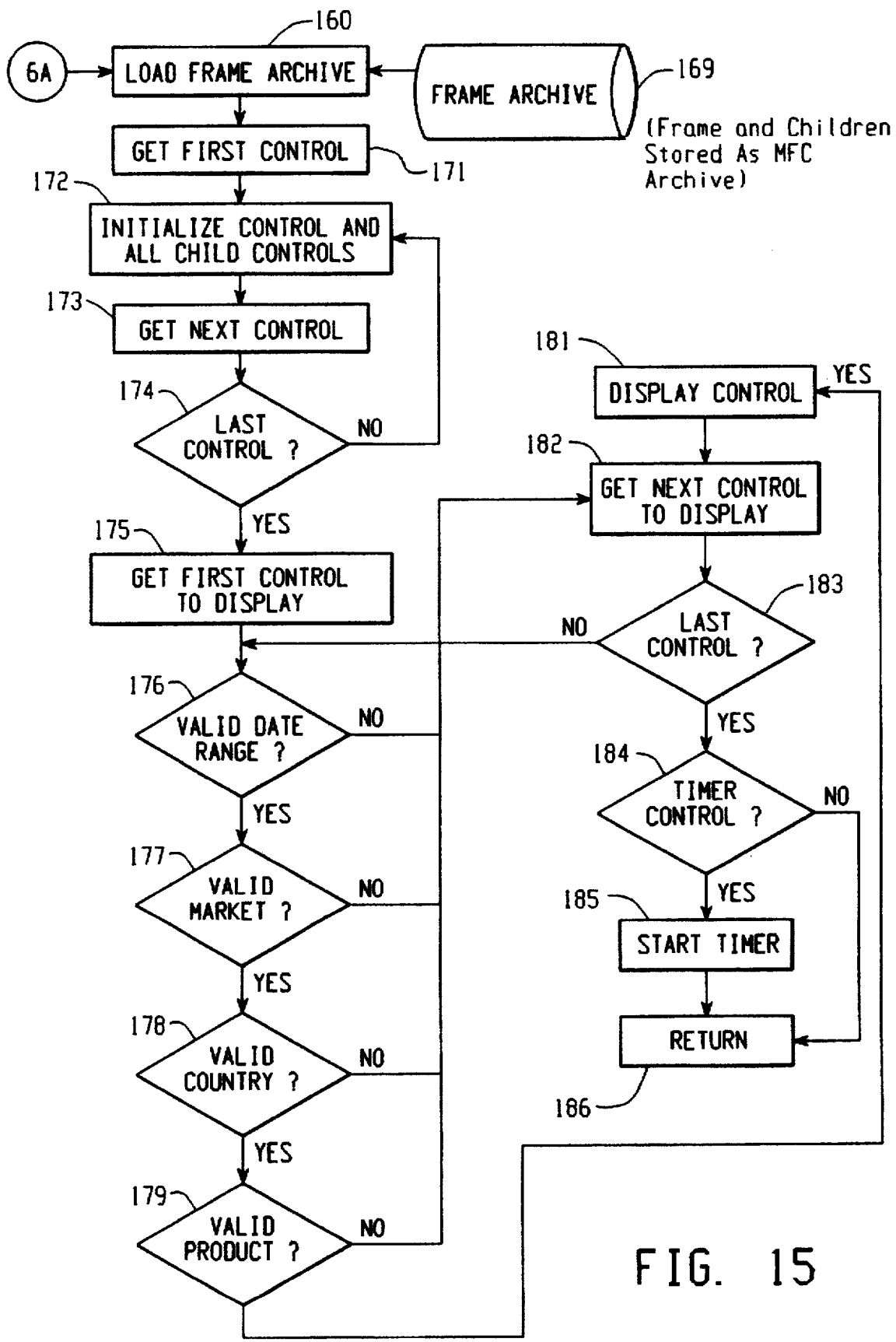
Figure 16:
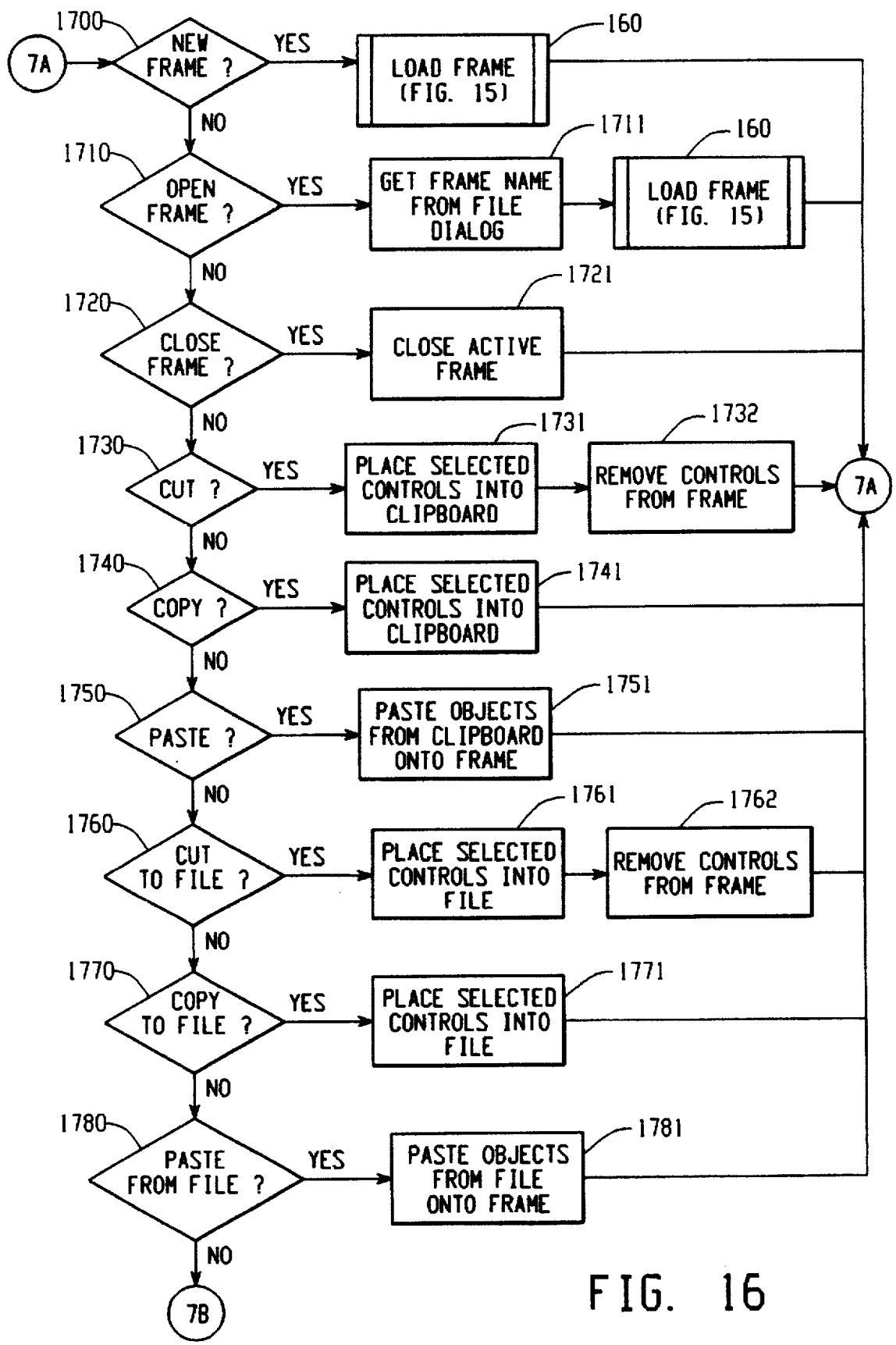
Figure 17:
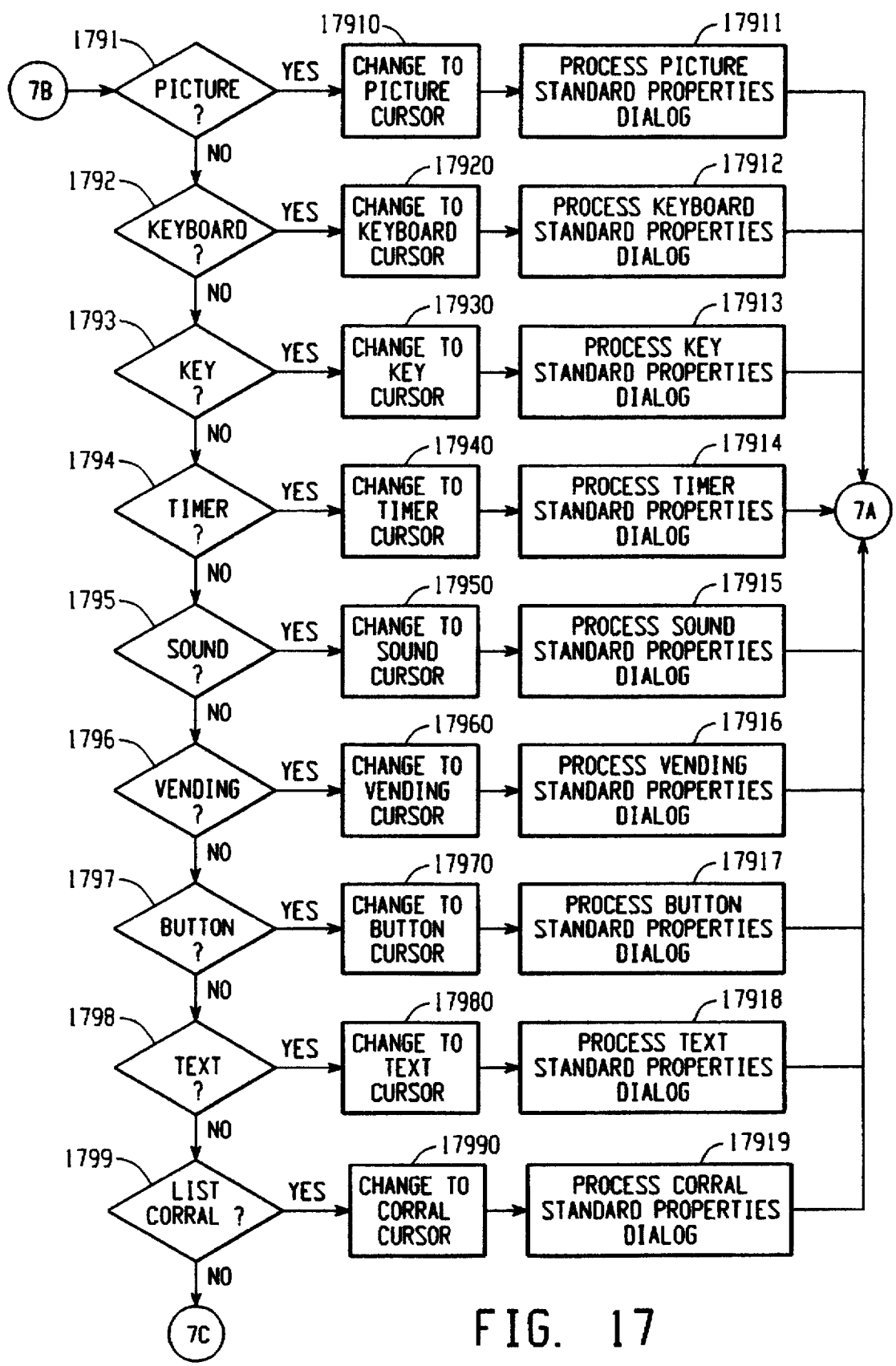
Figure 18:
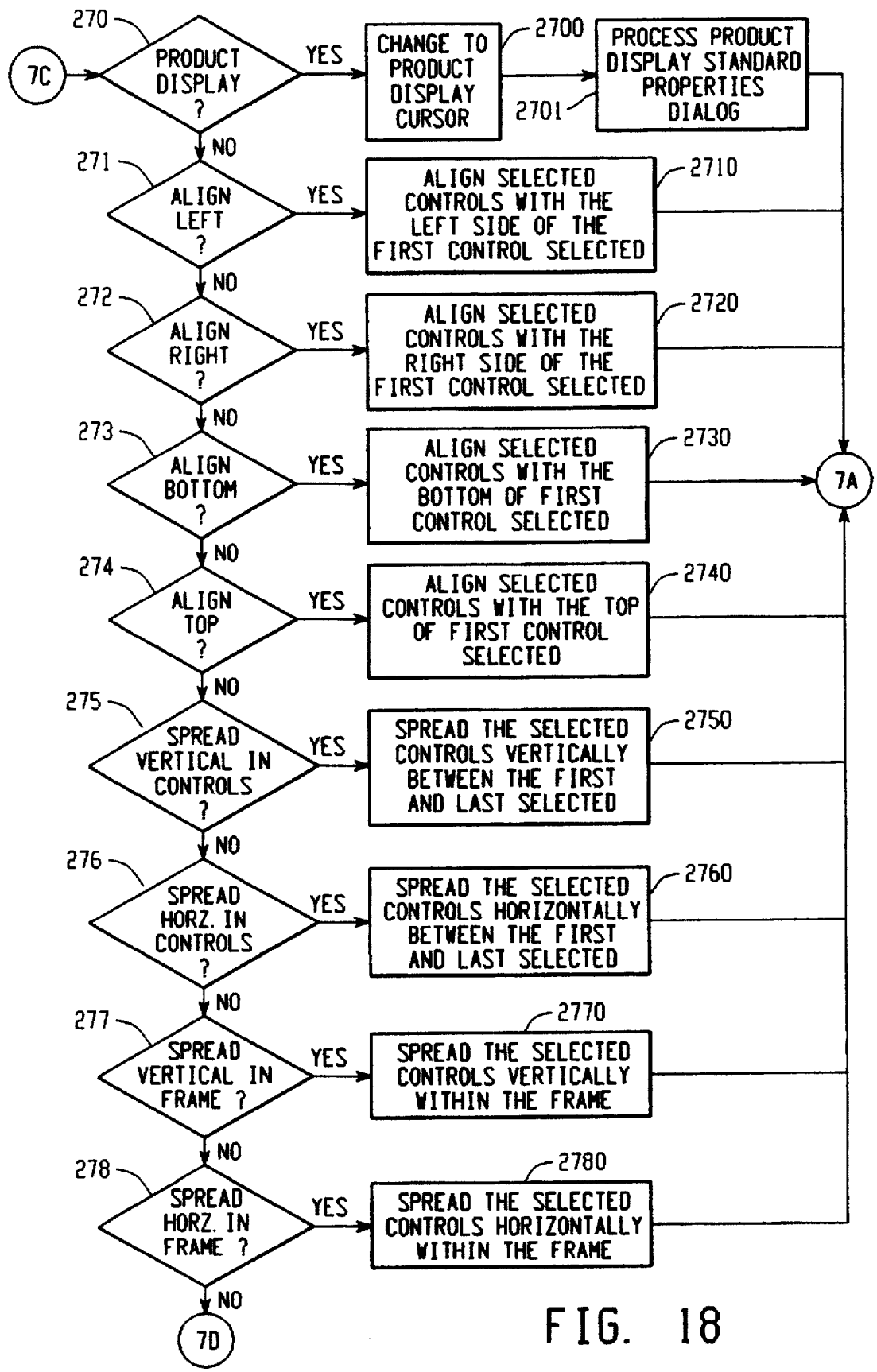
Figure 19:
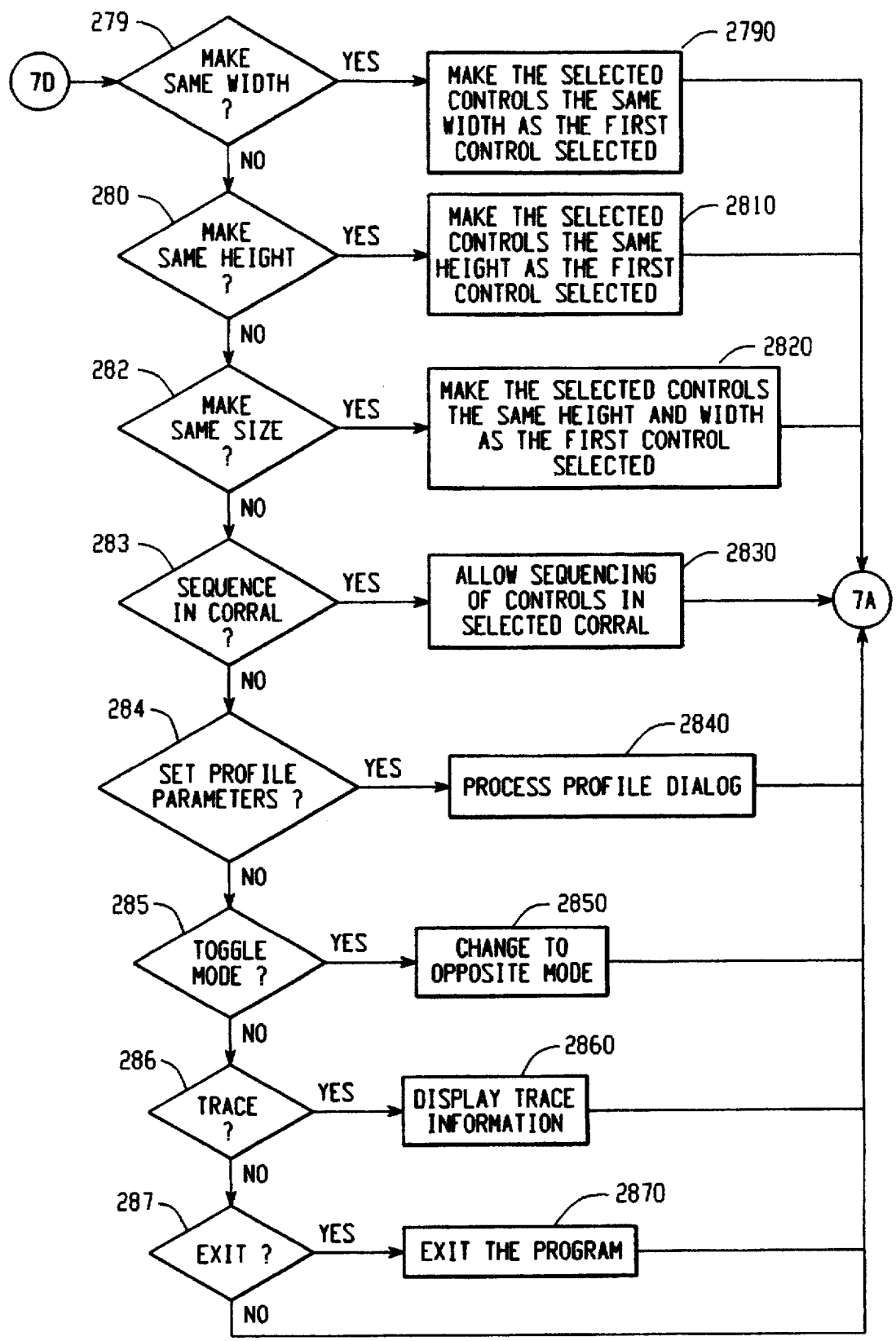
Figure 20:
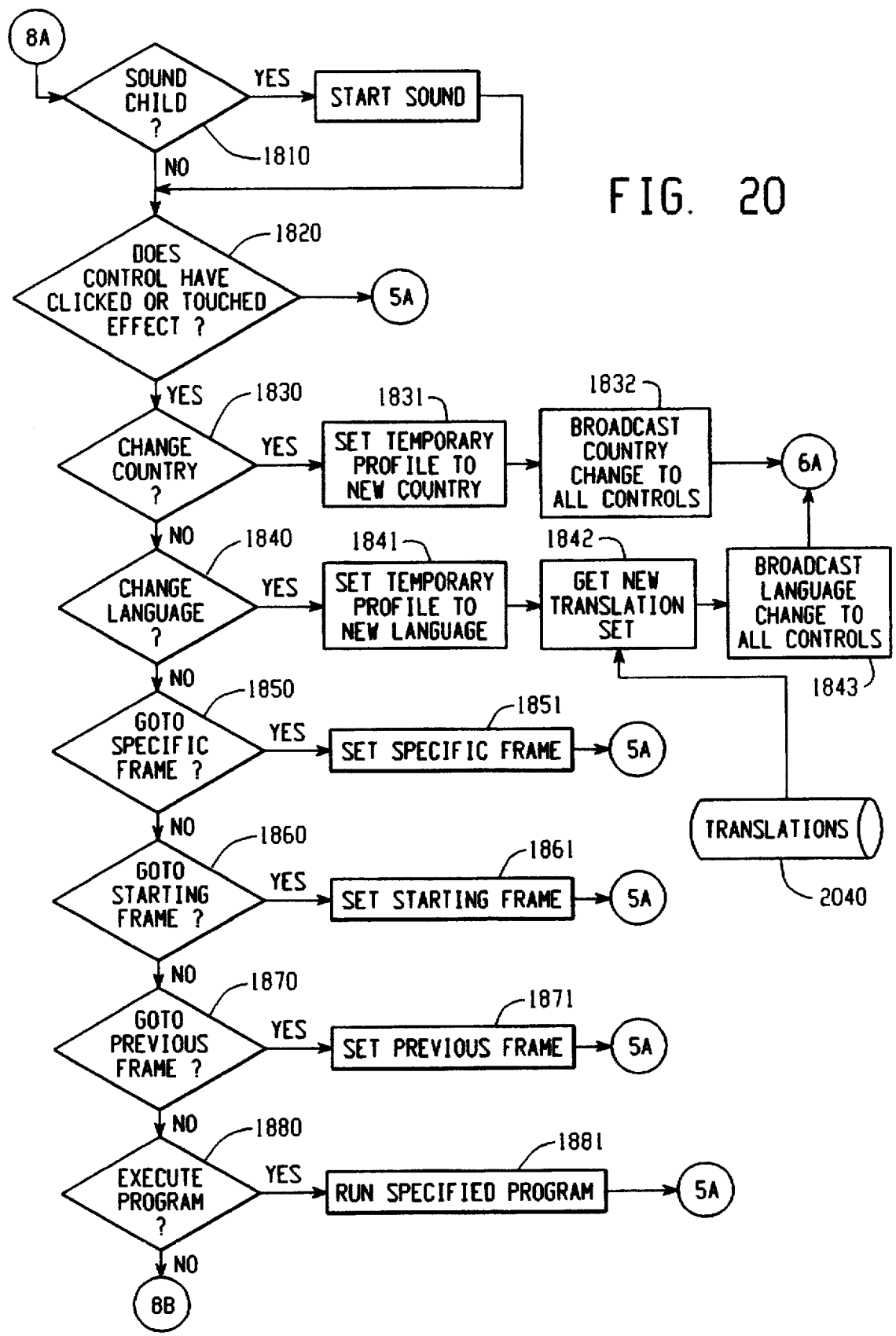
Figure 21:
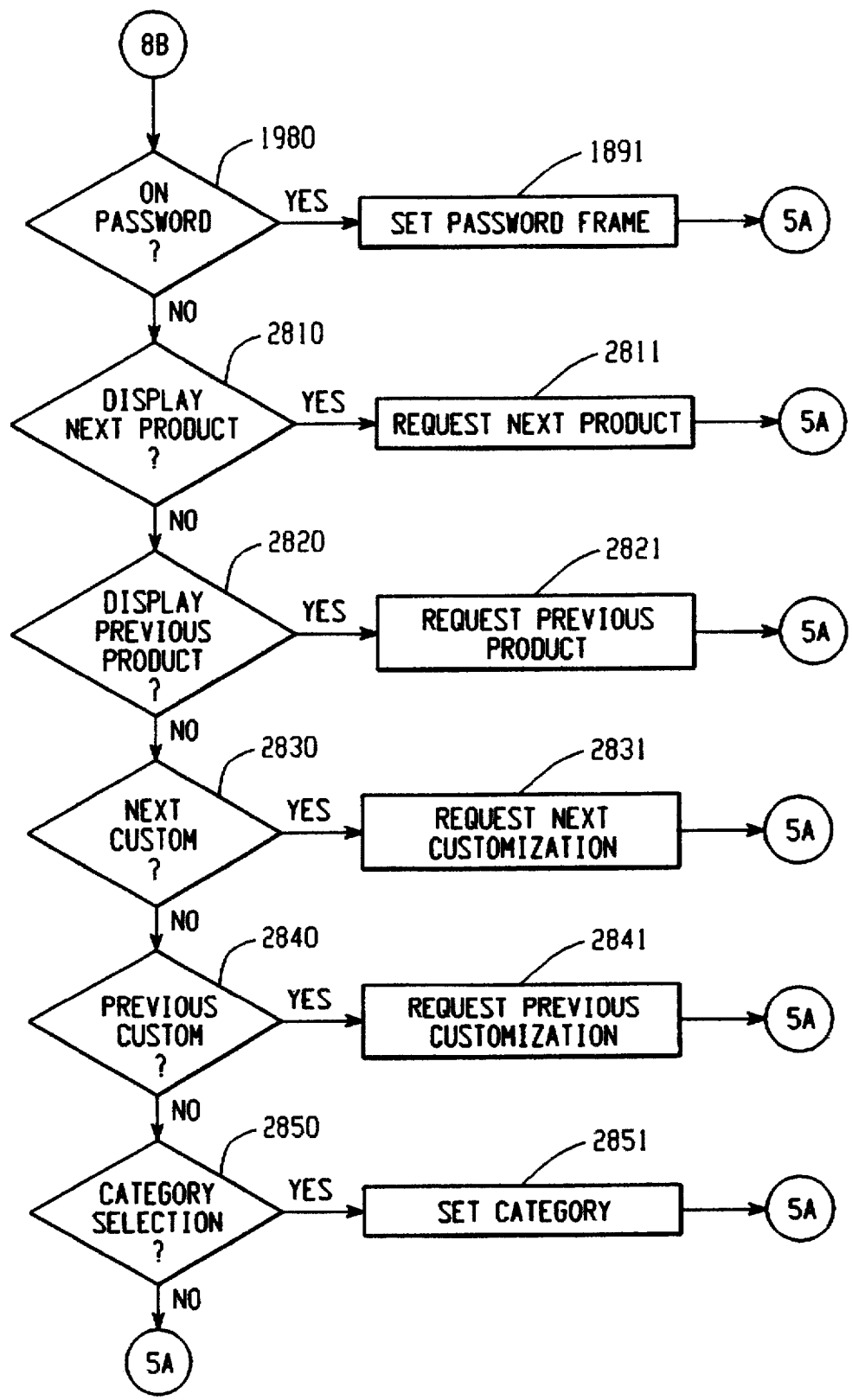
Figure 22:
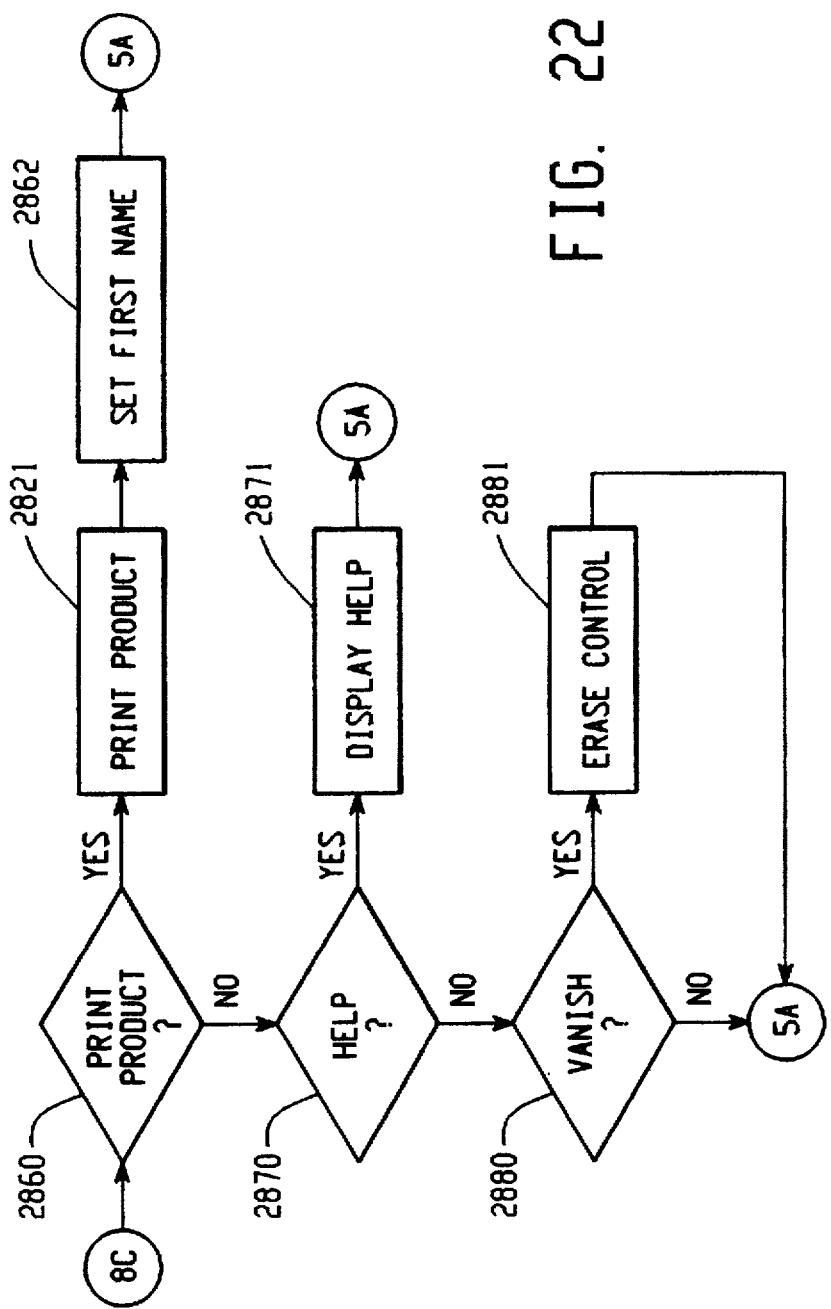

After a customer interface has been designed to accommodate a product line or a new market, the Consumer Interface may be tested in either the design mode (in which all controls, including sound and timer controls, are displayed) or the test mode (in which only controls that are meant to be visible are displayed). FIG. 13 illustrates, by means of a section of a flow chart, the actions taken by the Consumer Interface Designer/Kiosk Module as a result of a decision by an interface designer as to the mode of operation of the module.

After a Customer Interface is tested, it is then installed along with elements of some of the other modules to provide an on-site vending capability. This resultant on-site Customer Service system is essentially defined by the kiosk profile in combination with the database of products that may be retrieved through the kiosk-specific interface.

During the operation of the Consumer Interface, the Consumer Interface Designer/Kiosk collects marketing and point-of-sale ("POS") POS data (26) for later use in ensuring that credit or charge card purchases are collected and for analysis of marketing trends developed through interactions with the Consumer Interface. Among the market data collected and stored in the POS database are identifiers of the products sold and an indication of the menu paths through which the consumers found the products purchased. The structure of the data as stored, the "AccumlatedSales," can be found on Table I. By way of completeness, the hardware used to run the metasystem is now described. In the preferred embodiment as the software runs on a test and development system that includes a 486/33 mhz CPU, 32 MB of RAM, a sound card (such as an 8-bit Aztech V.2), a video card (such as an ATI Ultra Pro Mach 32), a CD-ROM drive (with double or triple speed capability) and standard data entry items (such as a mouse, a keyboard and a touch screen). For the Art Work Stations, the equipment in the preferred embodiment is the same as the test and development system, except in order to process efficiently the many graphic application demands on the system, the CPU is preferably a 486/66 mhz or faster. As to the field (Kiosk) units, each unit preferably includes each of the items associated with the test and development systems; however, only 16 MB is required for the preferred embodiment of the field unit parts of the invention. In addition, each test and development system, Art Work Station and field unit will have associated with it printers or plotters (such as the HP DeskJet 1200C, the HP 7500B Plotter or the HP DesignJet 650C).

The heart of the invention is the system by which consumer interfaces can be developed, the interface designer "metasystem" or Authoring System. This component of the overall invention can also be described in reference to the component objects or "controls" (as such objects are preferable termed by the inventors of the metasystem) that are made available to a user of the system, an author, from which to create a dynamic interface that is responsive to changes in the state of the environment in which the interface is to "played." Such changes in state, in the preferred embodiment, may be induced by the passage of time, or by the point in time in which the interface is being played, or by consumer interactions with the created interface. It should be easily understood by one of ordinary skill in the art that the controls may also be structured to be sensitive to (and thus responsive to) system errors or unavailability of data (or product), or from the detection by hardware components of the presence of a customer (such as through a voice recognition interface or a motion sensor). In the vending environment, the ability of an interface to mutate in recognition of the unavailability of a particular products (such as through a depleted on-site inventory is an important feature.

In the preferred embodiment, each control is an instantiation of a specialized window object created in a Microsoft® Windows™ environment through the use of an object-oriented programming language such as VisualC++ or VisualBasic. Each control serves as a building block of the interface that the author/interface designer using the system is trying to create. The type of controls that are available to an author, each with their own specific uses, abilities and characteristics include: frames, buttons, text areas, graphics areas, timer, vending enablers, sound players, keyboards, keyboard keys, product display areas, list corrals, customization edit corrals and customization text input areas. Associated with each such control is a corresponding object class. Those classes developed as a part of this inventions are indicated on FIGS. 9A–9B, 10A–10B, 11A–11C and 12A–12B as "Russ Tech Classes" and those utilized from the Microsoft Foundation Classes as similarly indicated as MFC Library classes.

In its simplest embodiment, the Authoring System provides a set of tools for associating one or more controls with a particular type of parent control, called a frame, for each screen that an author using the system wishes to include in a dynamic interface script. To understand the concept of such an interface script, consider by way of analogy an unusual orchestral that plays pieces of a symphony in an order and a manner that is responsive to audience reaction. The orchestra might, for example, play the overture last on the program as a result of the time of the year or the audience reaction to the prior segment performed and play the 2nd movement as the third movement for similar reasons. Alternatively, the orchestra might play the first movement without a horn section, again as a result of audience response (or lack thereof), or because of the date or time at which the movement is to be played, or because the horn section is unavailable or because the concert hall environment does not permit the playing of horns. Similarly, an interface script associated with an interface created using the system establishes pathways and the manner by which the interface will play at any given point in time and in light of any given history of consumer interaction with the interface.

Much like the orchestra and its written music for the various orchestra sections and movements, the interface "performance" cannot be described a priori through a true script, but can only be described in terms of the controls that are available to enable an interface performance that is dependent upon the environment in which it is played and upon audience (i.e. consumer) response. At the level of describing the system that comprises the invention, it is impossible to describe how an interface will function specifically because so such of the interface functionality is dependent upon the design of the interface author using the system and upon the customer interaction with the interface once it is designed and implemented. In one sense, once an interface is made available to a consumer, the consumer plays an important role in directing or programming the interface through the consumer's response to the information presented through the interface.

In light of the foregoing, it can be appreciated by one of ordinary skill in the art that the system can only be described through an understanding of the role certain controls play in the metasystem. Critical to this understanding is first understanding the role of a frame in the system comprising the invention.

Unlike the other control types, the frame is relatively limited in its abilities, but it occupies the top place in the hierarchy of controls. Essentially, when an author instantiates a frame, he creates a canvas upon which the author can place other controls that provide the ability to change the state of the environment in which the interface is designed to run and the pathing of the interface as it plays. These other controls are, by their placement on the frame, considered children of the frame, and the frame is considered the parent object with respect to the other controls. Each frame is defined by a frame class (CVKFrame) (46730) that is similar to, but not derived from the Microsoft Foundation Class (MFC) CFrame. Each class discussed herein can be found on the Authoring System (metasystem) Class hierarchy set forth on FIGS. 9A–9B, 10A–10B, 11A–11C and 12A–12B. For a description of the MFC hierarchy and the class library, the reader is referred to "Microsoft Foundation Class Library" by Steven Holzer, published by Brady Publishing, copyright 1993.

When an instantiation of a frame is saved, it is saved as an archive along with its associated children controls. When an interface is played, a previously-designated starting frame is retrieved from archive and each of its associated controls becomes "live," i.e., each control can, depending upon its nature, (i) affect what the interface displays (or in the case of sounds, plays) or which frame the interface will play next, or (ii) accept and process input through a touchscreen, a mouse, a keyboard or other input device, including a vending device. The frame itself, however, is incapable of performing any of these functions without having placed upon it (and thus associated with it) one of the other control types.

Chief among the other controls, and arguably the most versatile, is the button control. A button is an instantiation of the button control class defined in the preferred embodiment by an object class definition, VKButton (4690). VKButton, which has similarities to, but enables greater functional capabilities than, the MFC button class, CButton. As seen in FIGS. 11A–11C, Vkbutton is derived from another class developed by the inventors, which in turn is derived from MFC CWnd. As would be appreciated by one of ordinary skill in the art of object oriented programming, particularly programming using MFC's, each class that is represented on FIGS. 9A–9B, 10A–10B, 11A–11C and 12A–12B inherits from the class above it, all of the characteristics of that class as defined in the Microsoft Foundation Classes. Thus, the class that governs the control Vkbutton is also a Cwnd class (461), and inherits all that defines that class.

One items that differentiates CVKbutton from its parent class is the added "intelligence" that the class provides buttons. Indeed, it is the smart button features of the VKButton that enables the system to mutate in response to the passage of time or the state of the system as a result of consumer inputs to the interface or through a profile associated with the environment in which the interface is designed to operate. As discussed previously, the profile predefines certain initial environmental operating conditions, such as the default language of the interface (U.S.-English, Spanish, Latin American Spanish, German, Italian, UK-English, etc.), the default country of operation, the languages, countries, markets and products the interface supports, the initial date of the operation (month, day and year) of the interface, the serial number of the location where the interface will be installed, the address of the location, an indication of whether the system accepts cash vending and whether the system accepts credit card vending, a pointer to the directory in which environment-specific marketing frames are stored, and a list of those categories of products that, although otherwise available through the interface, are to be excluded from presentation by the interface. In the preferred embodiment, a button can alter a number of these parameters as will be seen below. It will be appreciated by one of ordinary skill in the art that a button class could be defined that would enable each of the profile aspects to be altered. It should also be appreciated that an interface could be developed without having a profile at all.

In the preferred embodiment, an instantiation of a button occurs when the button tool is clicked upon in the interface designer and a button window is drawn upon a frame. Though a dialog box, the button can be "programmed" to perform several tasks and to have certain characteristics. The tasks and characteristics of a button may include:

1. The ability to process that it has been touched (on a touch screen) or clicked (using a mouse), and in response to being clicked or touched, to take certain actions, including:
    a. Transferring control to specific frame;
    b. Executing a program by calling the program;
    c. Changing the operational language of the interface;
    d. Changing the country of operation; or
    e. Playing a sound file or a video clip by transferring control to an object comprising a particular file associated with a particular sound driver (such as a .wav or MIDI file) or video driver (such as Quick-Time for Windows, and MPEG player etc.).
2. Determining whether it is to be active (visible) under the operating conditions existing at the time the frame with which it is associated is invoked by examining its visibility parameters and "and-ing" the parameters with the system states determined from the profile and as a result of the prior interface action. If it determines that it is to be visible, it further looks at the length to time that has been set previously through a dialog box nd when invoked displays only for that period of time.

3. Displaying itself in accordance with its specific properties, including what text, pictures and colors are to displayed when the button is in an upstate and when the button is in a down state and whether it is a push button, a check box or a radio button.

With respect to changing the language, the button when clicked or touched sends out a message to the system that when calling the database, the pointer to relevant language-sensitive data items has been moved from one collum of each data table having such data to a second collum reflecting the new language. Effectively, the button serves as a means from switching a pointer from one database table collum that is language-dependent to another. By way of example, if a button is set to switch the interface language from English to Spanish, then the new database table columns pointers for Spanish will be broadcast to the system and the system, when retrieving text for the interface will correspondingly look in the proper column for the language text. Programmatically, this is accomplished through having each button sense whether it is to change the language when touched or clicked and then broadcasting a message to the system to indicate the pointers that have changed, if any.

Certain other aspects of the interface design metasytem and controls can be understood by further reference to the class hierarchy of FIGS. 9A–9B, 10A–10B, 11A–11C and 12A–12B. The hierarchy serves as a logical roadmap to the source code found in the microfiche appendix include as part of the patent application filing.

The first class developed as part of the metasystem is CSQLException (311). This class is a specialized version of the MFC class CExeption for exceptions as a result of using a Structured Query Language (SQL) database access program. In the preferred embodiment, any ODBC-compliant database management system (such as Microsoft SQL Server, Sybase, DB2, Oracle or Watcom SQL) can be used for database access. Another class, CMemHugeFile (321) enables the metasystem to save very large files as archive or Binary Large Objects (BLOBS) exceeding a 64K BLOB barrier that exists through the MFC CMemFile. Both CMemfile and CMemHugeFile are derived from the MFC CFile (320).

To enable the display of plotted text on a monitor so that it appears like the output of the text on a plotter, the class CopyCD(3310) is used to provide a specialized device context based upon the MFC CWindow DC(331) and CDC (330). To permit palette data to be standardized under the Rasterized Interchangeable File Format (RIFF) in the invention, the class CRIFFPalette (3410) has been derived from MFC CPalette (341). Two subclasses, CCorelPalette (3411) and CRGB256Pallette (3412), of the CRIFFPalette (3410) class enable the loading of Corel Palette and RGB palettes, respectively into a RIFF Palette.

In the course of developing the preferred embodiment, it became necessary to develop several miscellaneous class that are derived broadly from the Cobject (300) class and which affect modules other than the Consumer Interface Design module . These classes, 301–309, provide primarily miscellaneous housekeeping tools to enable the overall system to perform more efficiciently. Thus, CPath (301) permits changes in the current working directory and its subclass, CCACPath (302) establishes a common directory path for use by the metasystem. CDesktop (303) saves and restores the state of the Authoring System at any particular point in its operation. This class is particularly useful in starting the consumer interface version of the system.

CRetailProductClient (304) organizes various sales data for printing a sales report relating to kiosk operation. Classes CDesignElement(305) and CCopyElement (306) enable print and display of design elements, text fonts and rotations of text in accordance with layout instructions for a particular product. CWinExec (307) enables the monitoring and execution of programs outside the metasystem, such as maintenance and sales report generating programs. CAnimationFrame (308) enables the metasystem to perform animation as a part of a control included in an interface design. This class will enable an author to specify the pictures used, the length of playing time and the visibility of the control associated with the animation. Associated with that class is the CAnimation (309) class, which essentially serves as a container and manager of CAnimationFrames.

Figure 9A:
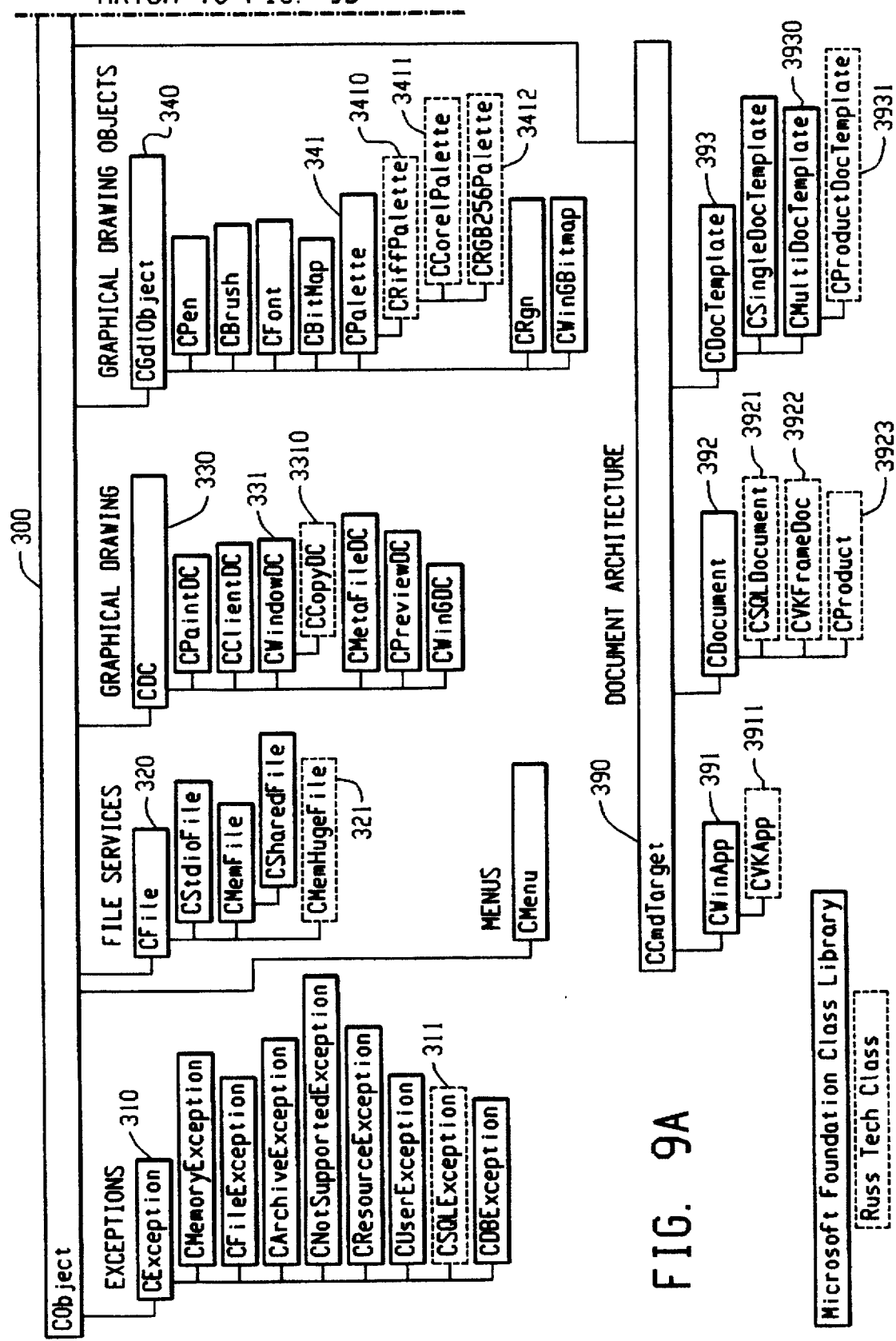
FIGS. 9A–9B, 10A–10B, 11A–11C and 12A–12B represent the object oriented class hierarchy for an alternative embodiment of the invention.
Figure 9B:
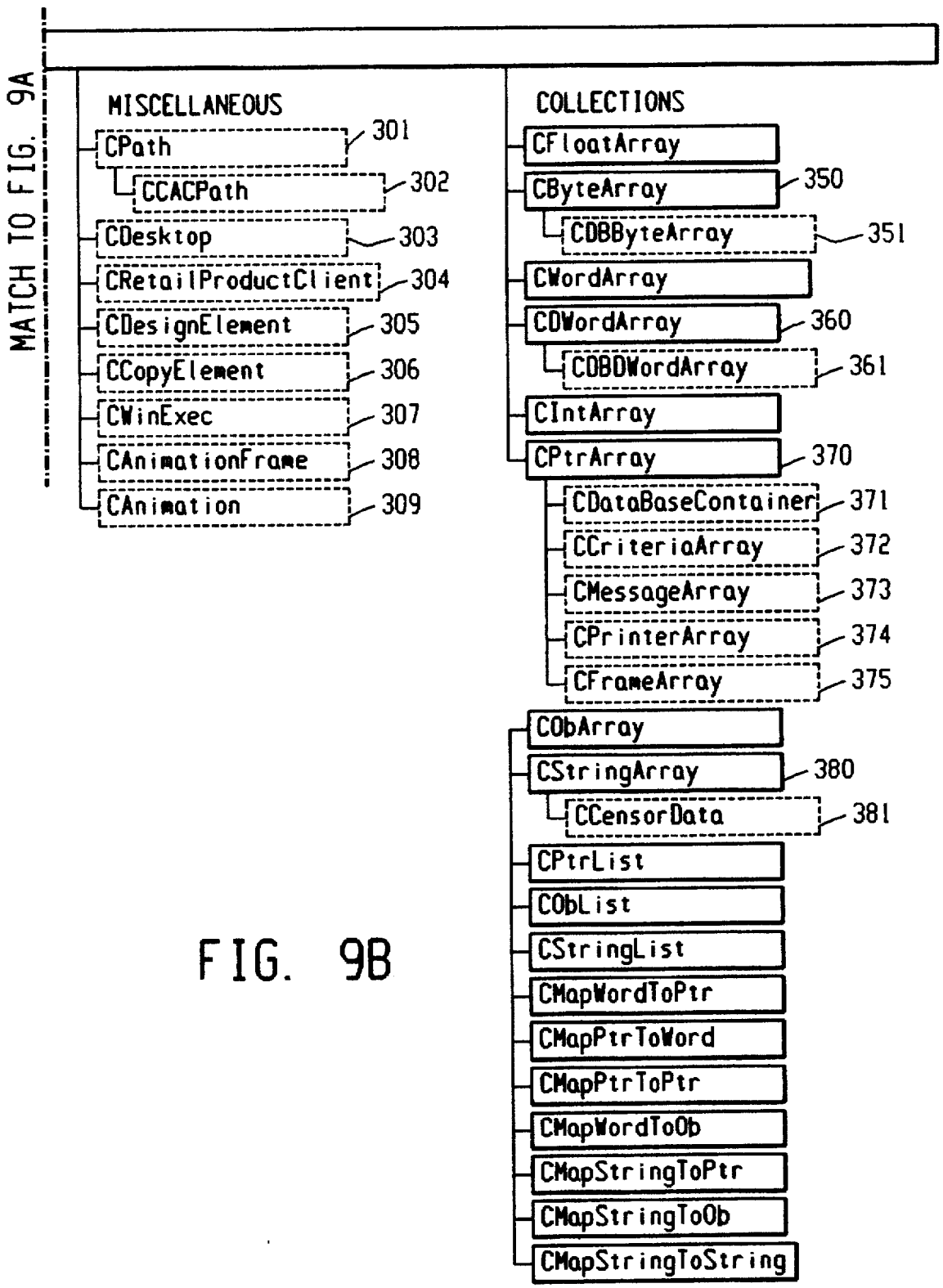

A number of collections or containers also needed to be developed to implement the preferred embodiment. This included CDBByteArray (351) and CDBDWordArrayd (351) contain byte arrays and double word arrays if they are in databases. CDatabaseContainer (370) serves as the database manager. Items 371–375 on FIG. 9A–9B provide containers for array of product criteria, Windows messages, printers and frames. A further collection is CCensorData (381) which performs the functions of managing words that are excluded from text customizations and precluding a user of a consumer interface from using censored words in text customizations.

Finally on FIGS. 9A–9B are a number of classes relating to document architecture. CVKapp (3911) is the class that implements the kiosk design module in both its design mode and its consumer/test modes. CSQLDocument (3921) is a null class for associating together documents, views and frames. CVKFrameDoc (3922) is a persistent object class that contains all the controls associated with frames as children, stores the frames as separate files and enables that controls to be retrieved with their corresponding frames. CProduct (3923) is a BLOB archive class that holds all data associated with a particular product. CProductDocTemplate (3931) overrides certain features of windows (such as borders and title bars) to enable frames to appear as a collection of objects on the screen and not as a window. This enables the interface to have the look and feel of prior art dos-based touchscreen interfaces without losing certain critical features and functions that the Windows environment provides.

Figure 10A:
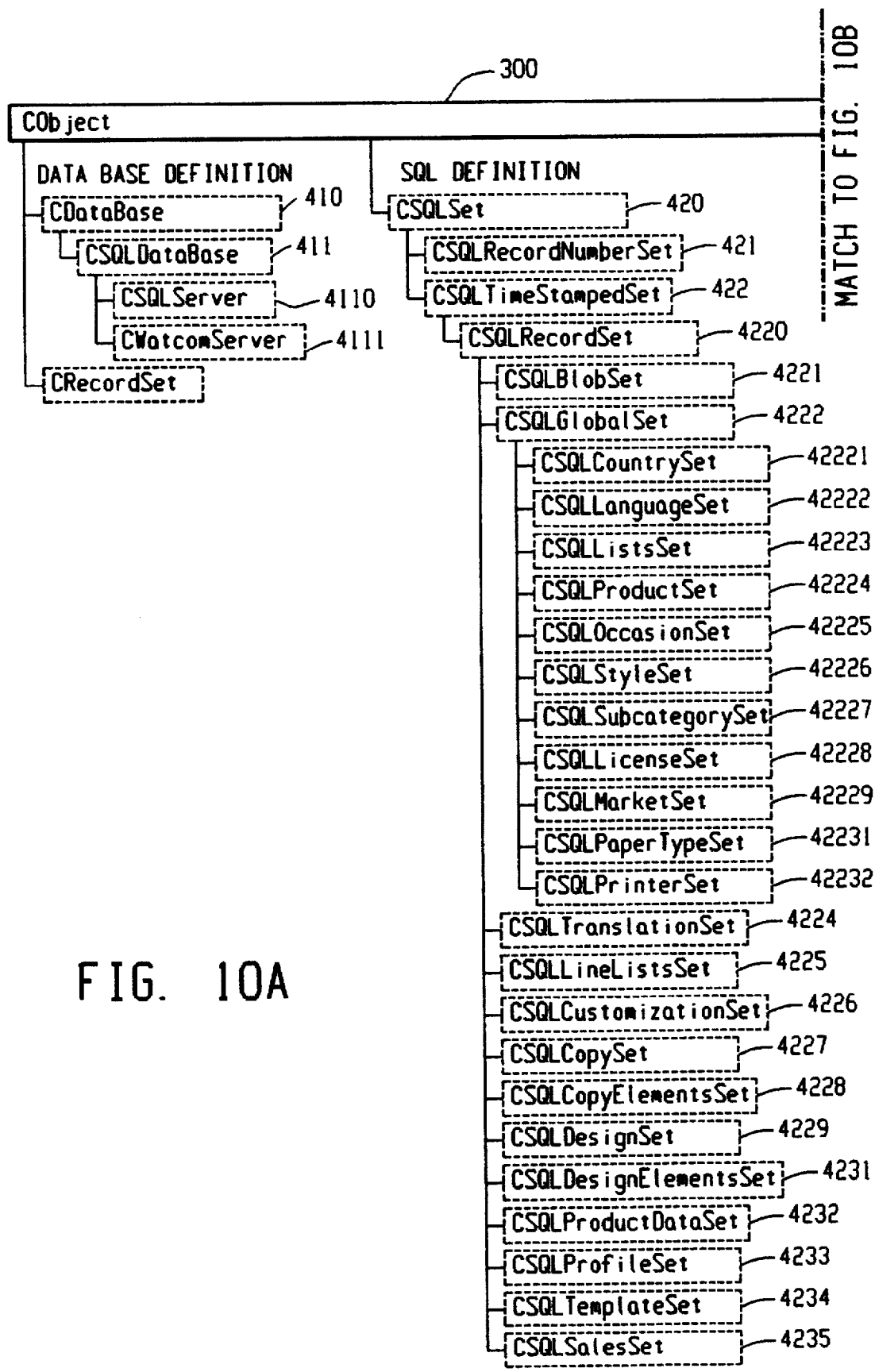
Figure 10B:
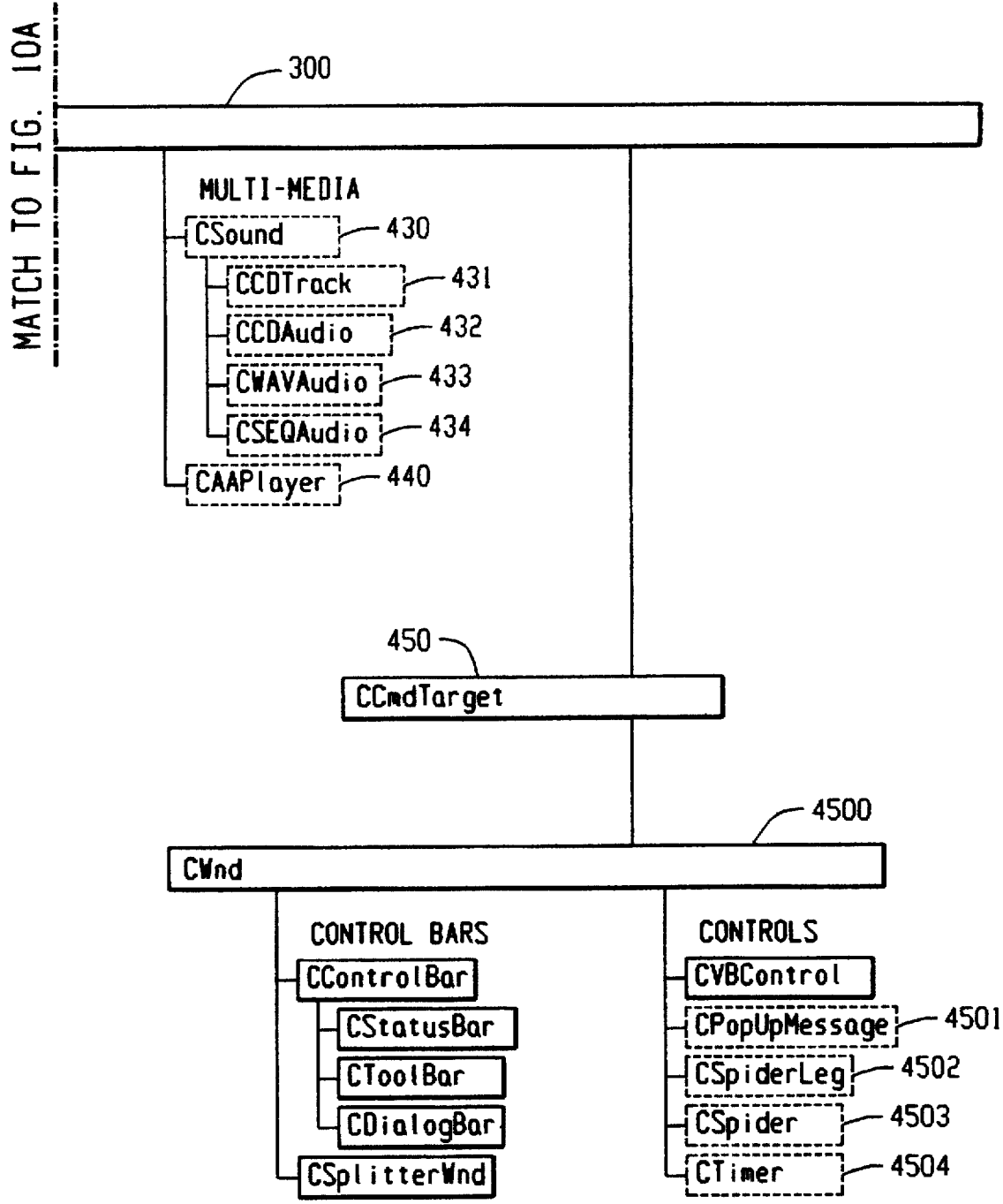
Figure 11A:
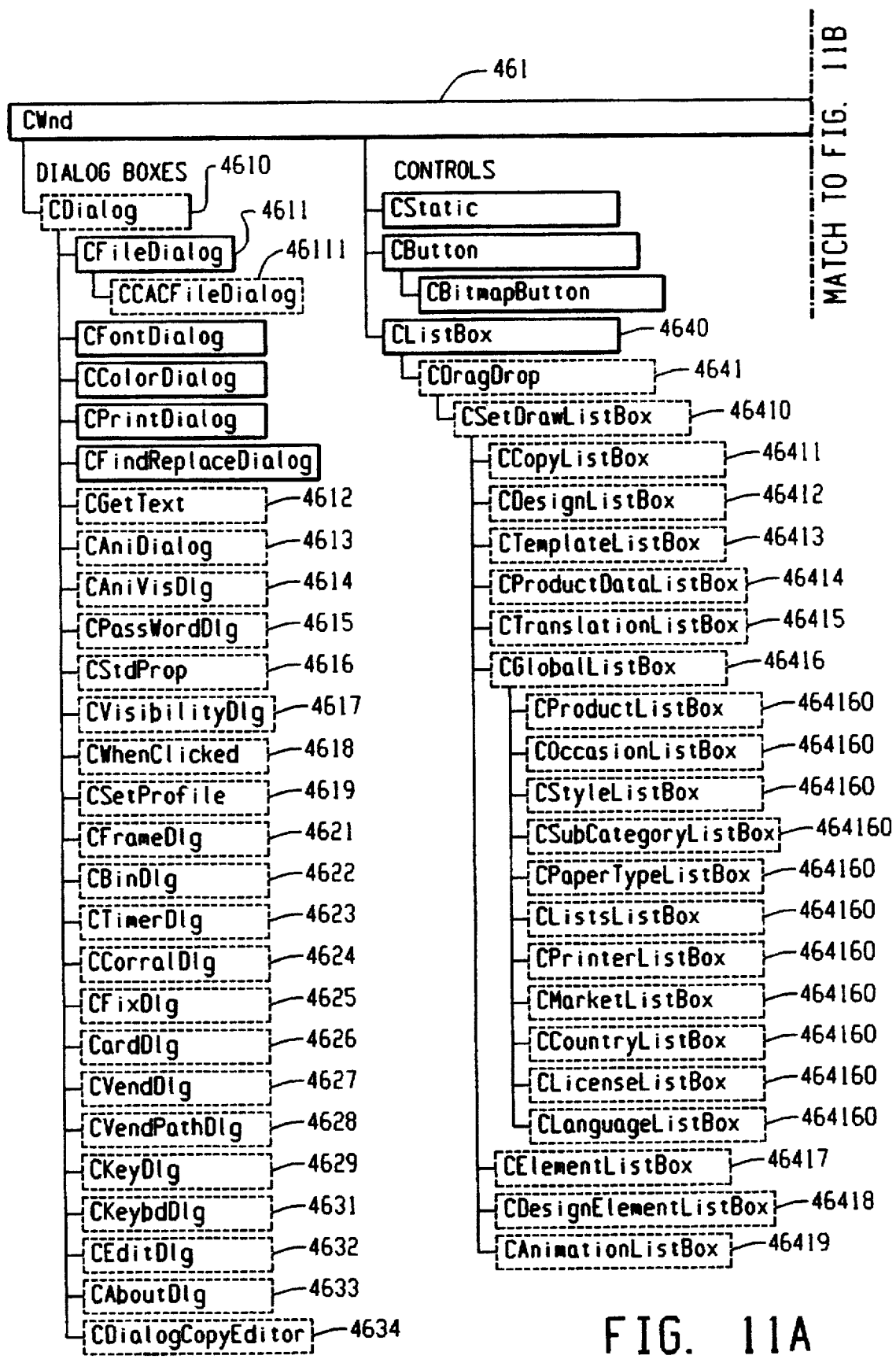
Figure 11B:
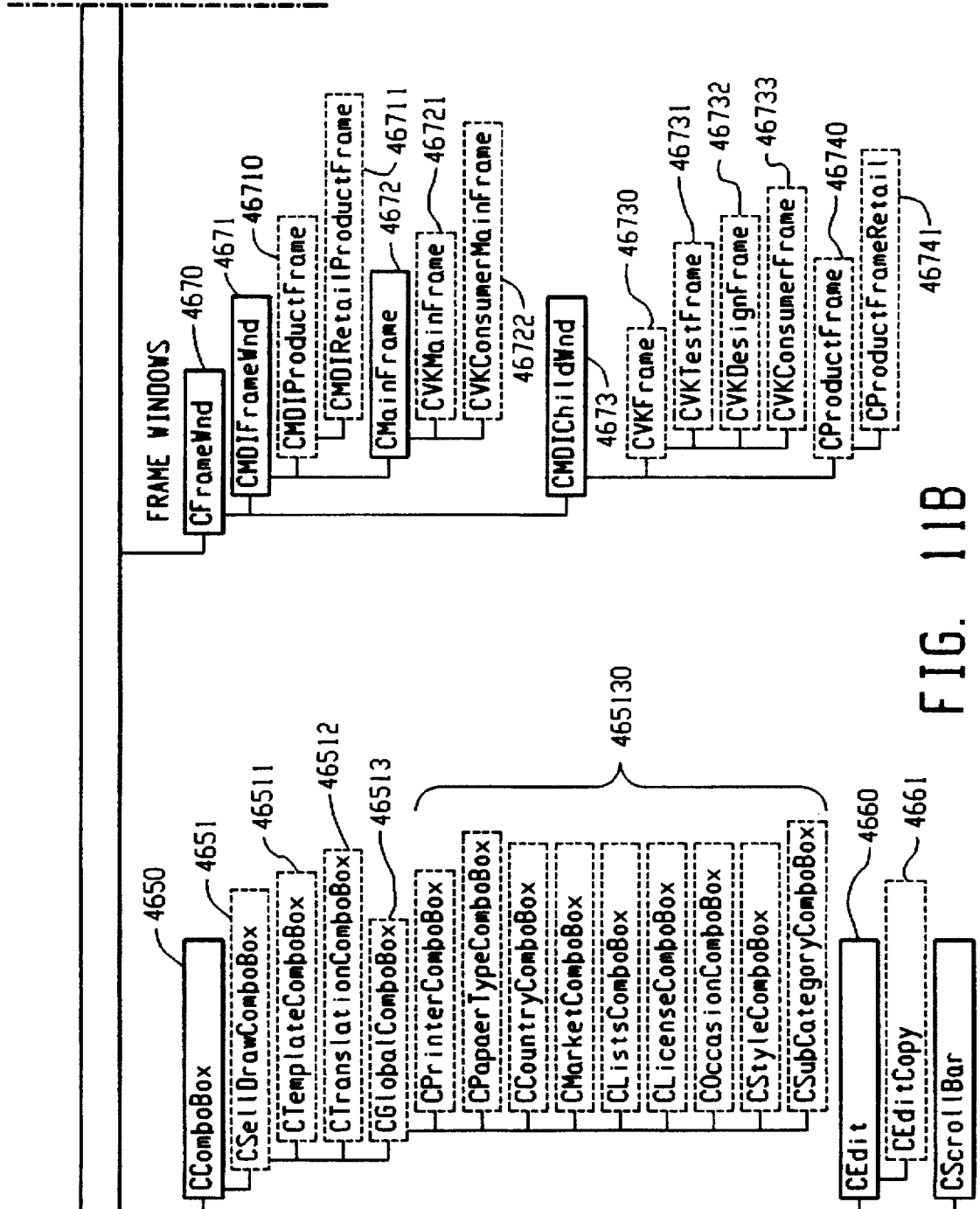
Figure 11C:
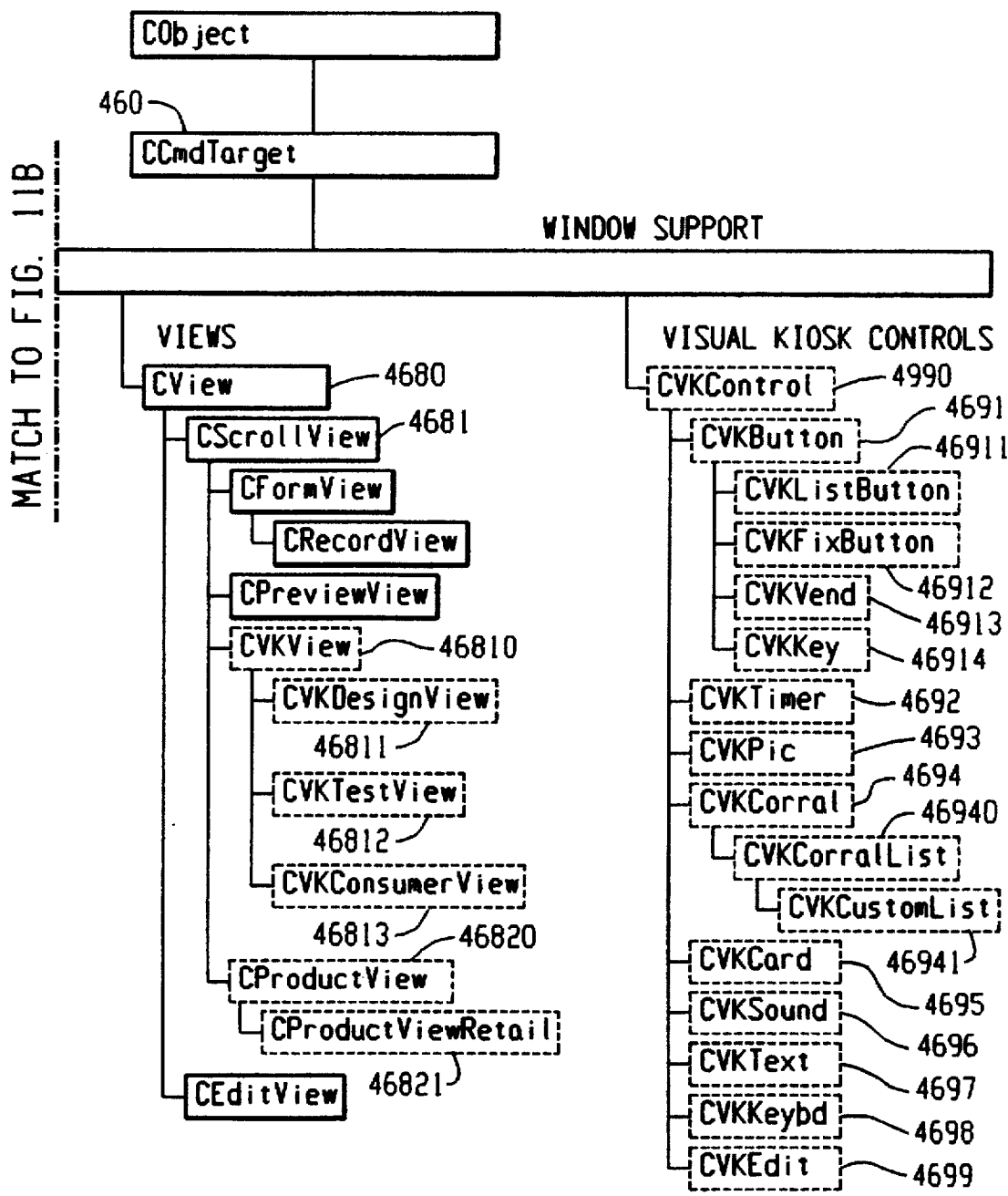
Figure 12A:
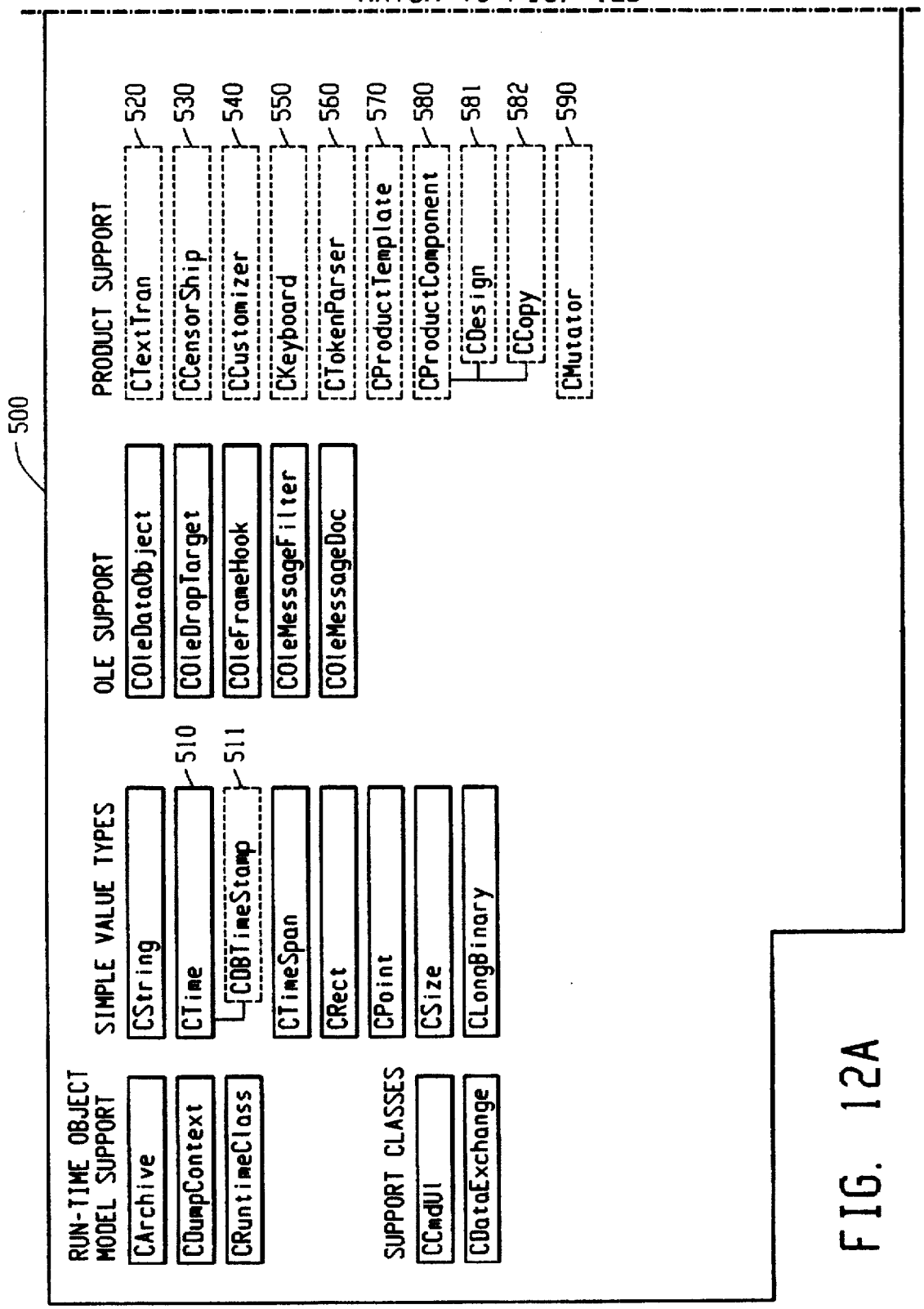
Figure 12B:
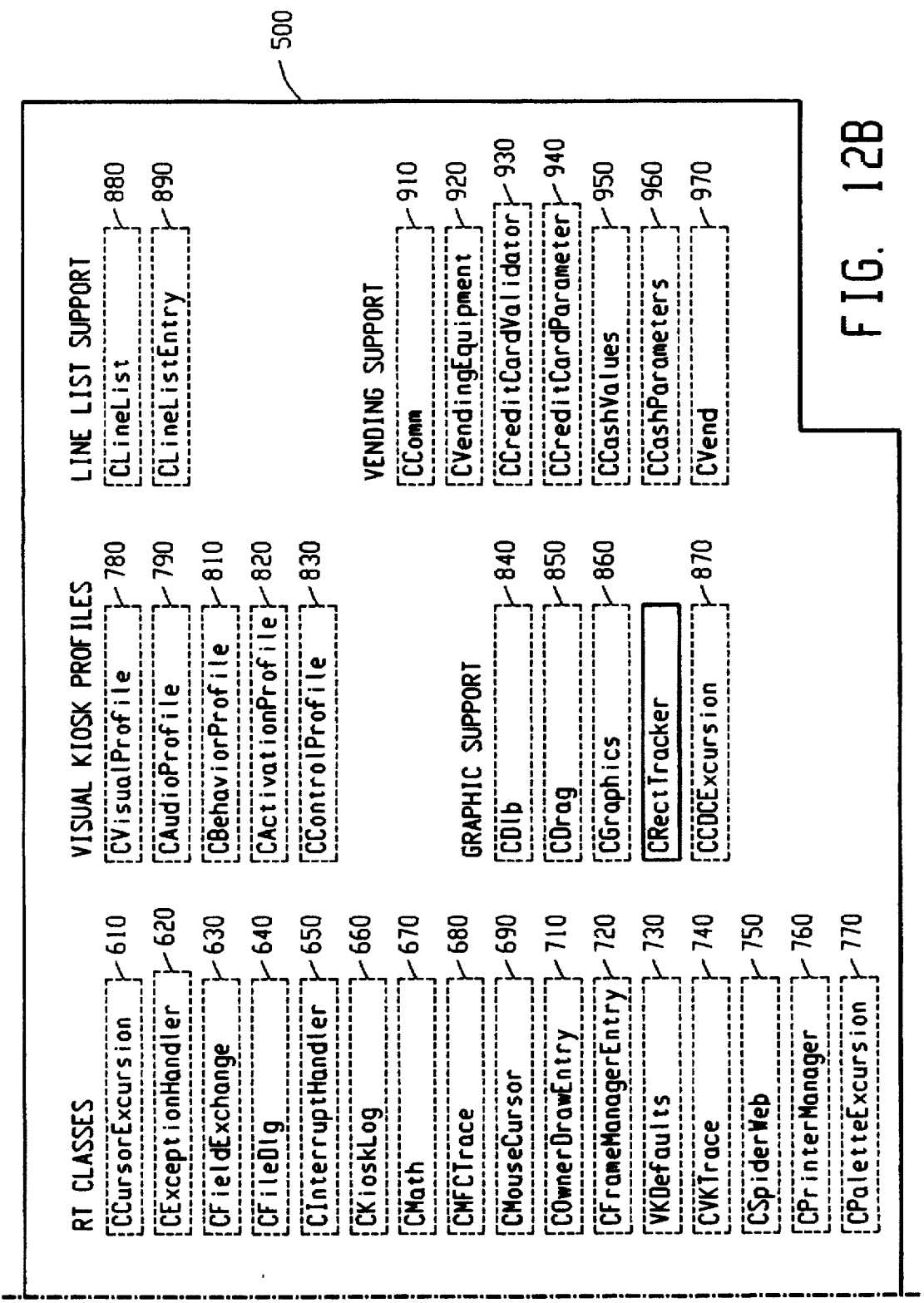

Referring now to FIGS. 10A–10B, to bring about efficiencies in the operation of the SQL database management system, the CSQLDataBase class (411), a CDataBase class (410) that has been particularized to the invention was created by removing some features of its parent class and overriding other features. Two subclasses, CSQLServer (4110) and CWatcomServer (4111), are further particularized to use more efficiently Microsoft SQLServer and Watcom SQL, respectively.

The SQLSet (420) class and the classes derived from it (421, 422, 4220–4222, 4224–2229, 3231–4235, 42221–42229, 42231 and 42232) together enable the functioning of the SQL database subsystems in the preferred embodiment. The functions these classes enable include the supplying of unique record numbers, the timestamping of creators and modifiers of data, and the defining of column names in database tables.

The multimedia classes (430–434, 440) enable the use of certain multimedia functions in a more efficient manner. The CAAPlayer class enables the system to handle AA animation files in FLC/FLI formats. The control classes are controls that either MFC did not provide at the time of the creation of the preferred embodiment or were not as efficient as those provided by the inventors. CPopUpMessage (4501) displays text at the start of a routine that goes away after a period of time. CSpiderLeg and CSpider (4502 and 4503) are sizing and aligning tools for placing controls on frames. CTimer (4504) is a simple timer function not directly provided by the MFC Library.

Turning now to FIGS. 11A–11B, the Dialog Boxes Classes derived from the MFC CDialog (4610) are those classes that generate dialog boxes for various interactions with the user. Of particular interest is CCACFile Dialog (4611), which restricts the selection of files to the pathway directed by CCACPath (302). The Control Classes (4640, 4650, 4660 and the subclasses under each) implement specialized list box functions, combo box functions and edit functions. Of particular interest are the CDragDrop class (4641), which extends the MFC drag and drop function from files (as supported in Windows 3.1) to generic datatypes and the CAnimationListBox (46419), which allows the selection of animation as part of the interface design.

The remaining classes on FIGS. 11A–11C and 12A–12B are directed to particular aspects of frames, views, controls and other miscellaneous functions at the periphery of the preferred embodiment. The core of the preferred embodiment lies in the controls defined under CVKControl (4690) and its subclasses. These classes define each of the controls discussed above. As to the other classes, a detailed understanding can easily be obtained through an inspection of the source code appendix.

Although the present invention has been described and illustrated in detail above and through the Figures, it is intended that the spirit and scope of the invention be interpreted as including the foregoing by way of illustration, and that the same be limited only by the appended claims as interpreted in light of the foregoing and all other equivalents.

TABLE I

Authoring System Database (ASDATA) Dictionary
Accumulated Sales - Stores Product Sales Data

| | | | | |
|---|---|---|---|---|
| PK | RecordNumber | int | 4 | Unique number, never reused (RecordNumbers/ AccumulatedSales) |
| FK | SerialNumber | varchar | 255 | Foreign Key to Profiles |
| FK | ProductNumber | int | 4 | Foreign Key to LineList (ProductNumber) |
| | CreditCardNumber | varchar | 255 | If vending by credit card, the card number. If vending by cash, "CASH" |
| | Amount | float | 8 | If vending, the collected sales amount |
| | VendType | int | 4 | 0 = Cash. For others see Vending Parameter Maintenance |
| | CDVolume | int | 4 | CD Volume in the format 'xxmmyy' where xx = Volume Number |
| FK | Category | int | 4 | Foreign Key to LineList (RecordNumber) |
| | Frame | varchar | 255 | List of the frame names traversed to this product selection |
| FK | CustomCountry | int | 4 | Foreign Key to Countries - Country at time of personalization |
| FK | CustomLanguage | int | 4 | Foreign Key to Language - Language at time of personalization |

TABLE I-continued

Authoring System Database (ASDATA) Dictionary
Accumulated Sales - Stores Product Sales Data

| | | | |
|---|---|---|---|
| DateCreated | datetime | 8 | |
| CreatedBy | varchar | 50 | |
| DateModified | datetime | 8 | |
| ModifiedBy | varchar | 50 | |
| QuantityPrinted | int | 4 | Number of copies printed |

TABLE II

BlobData - Stores Archive data (i.e. Line List display)

| | | |
|---|---|---|
| DataType | int | 4 |
| Blob | image | 16 |

TABLE III

Authoring System Database (ASDATA) Dictionary
Copy - Stores Copy identity information 1 per Copy Number

| | | | | |
|---|---|---|---|---|
| PK | RecordNumber | int | 4 | Unique number, never reused (RecordNumbers/Copy) |
| K | CopyNumber | int | 4 | CopyNumber, never reused (RecordNumbers/ CopyNumber(Field)) |
| K | CopyVersion | smallint | 2 | Copy Version |
| | Description | varchar | 254 | Copy Description |
| | Editor | varchar | 254 | Copy Editor Name |
| | Author | varchar | 254 | Copy Author Name |
| | Source | varchar | 254 | Copy Source |
| FK | License | int | 4 | Foreign Key to License table |
| | DateCreated | datetime | 8 | Time stamp when row was inserted |
| | CreatedBy | varchar | 50 | User name (from SYSTEM.INI, UserName=) |
| | DateModified | datetime | 8 | Time stamp when row was inserted, or changed |
| | ModifiedBy | varchar | 50 | User name |

TABLE IV

Authoring System Database (ASDATA) Dictionary
CopyLangx - Stores copy text elements by language (x = Languages key). Many per Copy row

| | | | | |
|---|---|---|---|---|
| PK | RecordNumber | int | 4 | Unique number, never reused (RecordNumbers/ CopyLangx) |
| K | CopyNumber | int | 4 | Combined with Copy Version for compound key to Copy and with ElementNumber to uniquely ID row |
| K | CopyVersion | smallint | 2 | |
| K | ElementNumber | int | 4 | 0 through number of elements within CopyNumber/CopyVersion |
| | Description | varchar | 255 | Copy element description |
| FK's | Element | text | 16 | The copy element - contains 1) text 2) Foreign key(s) to CopyCustomizations or 3) both |
| | DateCreated | datetime | 8 | |
| | CreatedBy | varchar | 50 | |
| | DateModified | datetime | 8 | |
| | ModifiedBy | varchar | 50 | |

TABLE V

Authoring System Database (ASDATA) Dictionary
CopyCustomizations - Stores each unique combination of personalization
characteristics ('Precustom' thru 'List')

| | | | | |
|---|---|---|---|---|
| PK | RecordNumber | int | 4 | Unique number, never reused (RecordNumbers/ CopyCustomizations) |
| FK | Precustom | int | 4 | Foreign Key to Lists |
| FK | PrecustomList | int | 4 | Foreign Key to ListxLangy where x = PrecustomList value and y = Languages key |
| FK | KeyBPrompt | int | 4 | Foreign Key to Lists |
| FK | KeyBPromptList | int | 4 | Foreign Key to ListxLangy where x = KeyBPromptList value and y = Languages key |
| FK | List | int | 4 | If not 0 Foreign Key to Lists (List to display i.e. 'Closings' list) |
| | DateCreated | datetime | 8 | |
| | CreatedBy | varchar | 50 | |
| | DateModified | datetime | 8 | |
| | ModifiedBy | varchar | 50 | |

TABLE VI

Countries - Stores Country Names

| | | | | |
|---|---|---|---|---|
| PK | RecordNumber | int | 4 | Unique number, never reused (RecordNumbers/ Countries) |
| | Text | varchar | 255 | Country Name |
| | DateCreated | datetime | 8 | |
| | CreatedBy | varchar | 50 | |
| | DateModified | datetime | 8 | |
| | ModifiedBy | varchar | 50 | |

TABLE VII

Authoring System Database (ASDATA) Dictionary
Design - Stores Design identity information 1 per Design Number

| | | | | |
|---|---|---|---|---|
| PK | RecordNumber | int | 4 | Unique number, never reused (RecordNumbers/Design) |
| K | DesignNumber | int | 4 | DesignNumber, never reused (RecordNumbers/ DesignNumber(Field)) |
| K | DesignVersion | smallint | 2 | Design Version |
| | Description | varchar | 255 | Design Description |
| | Editor | varchar | 255 | Design Editor |
| | Author | varchar | 255 | Design Author |
| | Source | varchar | 255 | Design Source |
| FK | License | int | 4 | Foreign Key to Licenses table |
| | DateCreated | datetime | 8 | |
| | CreatedBy | varchar | 50 | |
| | DateModified | datetime | 8 | |
| | ModifiedBy | varchar | 50 | |

TABLE VIII

Authoring System Database (ASDATA) Dictionary
DesignElements - Stores design element path/file name.
Many per Design row

| | | | | |
|---|---|---|---|---|
| PK | RecordNumber | int | 4 | Unique number, never reused (RecordNumbers/ DesignElements) |
| K | DesignNumber | int | 4 | Combined with Design Version for compound key to Design and with ElementNumber to uniquely ID row |

TABLE VIII-continued

Authoring System Database (ASDATA) Dictionary
DesignElements - Stores design element path/file name.
Many per Design row

| | | | | |
|---|---|---|---|---|
| K | DesignVersion | smallint | 2 | |
| K | ElementNumber | smallint | 2 | 0 through number of elements within DesignNumber/ DesignVersion |
| | Description | varchar | 255 | Element Description |
| | Element | text | 16 | Path and File Name of design element |
| | DateCreated | datetime | 8 | |
| | CreatedBy | varchar | 50 | |
| | DateModified | datetime | 8 | |
| | ModifiedBy | varchar | 50 | |

TABLE IX

Languages - Stores Language Names

| | | | | |
|---|---|---|---|---|
| PK | RecordNumber | int | 4 | Unique number, never reused (RecordNumbers/ Languages) |
| | Text | varchar | 255 | Language Description |
| | KeyboardDLL | varchar | 50 | Keyboard DLL for this language |
| | DateCreated | datetime | 8 | |
| | CreatedBy | varchar | 255 | |
| | DateModified | datetime | 8 | |
| | ModifiedBy | varchar | 255 | |

TABLE X

Authoring System Database (ASDATA) Dictionary
Licenses - Stores Licensed Character Names

| | | | | |
|---|---|---|---|---|
| PK | RecordNumber | int | 4 | Unique number, never reused (RecordNumbers/ Licenses) |
| | Text | varchar | 255 | Licensed character name (i.e. 'Rug Rats') |
| | DateCreated | datetime | 8 | |
| | CreatedBy | varchar | 50 | |
| | DateModified | datetime | 8 | |
| | ModifiedBy | varchar | 50 | |
| | Licensor_name | char | 40 | Licensor Name (i.e. 'Nickelodeon') |

TABLE XI

Authoring System Database (ASDATA) Dictionary
LineList - Stores Line List categories and Product Numbers

| | | | | |
|---|---|---|---|---|
| PK | RecordNumber | int | 4 | Unique number, never reused (RecordNumbers/ LineList) |
| K | Category | int | 4 | Identifies unique grouping of Product, Occasion, Style, SubCat1-4 |
| K | Sequence | int | 4 | Product display sequence within category (if = 0 it is not a Product) |
| FK | Product | int | 4 | Foreign Key to Products table |
| FK | Occasion | int | 4 | Foreign Key to Occasions table |
| FK | Style | int | 4 | Foreign Key to Styles table |
| FK | SubCat1 | int | 4 | Foreign Key to SubCategories table |
| FK | SubCat2 | int | 4 | Foreign Key to SubCategories table |
| FK | SubCat3 | int | 4 | Foreign Key to SubCategories table |
| FK | SubCat4 | int | 4 | Foreign Key to SubCategories |

TABLE XI-continued

Authoring System Database (ASDATA) Dictionary
LineList - Stores Line List categories and Product Numbers

| | | | | |
|---|---|---|---|---|
| FK | ProductNumber | int | 4 | Foreign Key to ProductData table |
| | Type | int | 4 | For Drag & Drop (T/F) |
| | Level | int | 4 | Indentation for Listbox display (0-n) |
| | Rating | float | 8 | |
| | Description | varchar | 255 | From ProductData for Reporting Level description, 'Text' from lowest level, or Product Description |
| | DateCreated | datetime | 8 | |
| | CreatedBy | char | 50 | |
| | DateModified | datetime | 8 | |
| | ModifiedBy | char | 50 | |

TABLE XII

Authoring System Database (ASDATA) Dictionary
ListxLangy (x = 'Lists', y = 'Languages') - Stores 'text' by List (Button, Pre-Customization, Keyboard Desc., etc), by Language

| | | | | |
|---|---|---|---|---|
| PK | RecordNumber | int | 4 | Unique number, never reused (RecordNumbers/ ListxLangy) |
| | Text | text | 16 | Translated Text |
| | DateCreated | datetime | 8 | |
| | CreatedBy | varchar | 50 | |
| | DateModified | datetime | 8 | |
| | ModifiedBy | varchar | 50 | |

TABLE XIII

Lists - Stores List Names

| | | | | |
|---|---|---|---|---|
| PK | RecordNumber | int | 4 | Unique number, never reused (RecordNumbers/Lists) |
| | Text | varchar | 255 | List Description |
| | DateCreated | datetime | 8 | |
| | CreatedBy | varchar | 255 | |
| | DateModified | datetime | 8 | |
| | ModifiedBy | varchar | 255 | |

TABLE XIV

Authoring System Database (ASDATA) Dictionary
Markets - Stores Market Names

| | | | | |
|---|---|---|---|---|
| PK | RecordNumber | int | 4 | Unique number, never reused (RecordNumbers/ Markets) |
| | Text | varchar | 255 | Market Description |
| | DateCreated | datetime | 8 | |
| | CreatedBy | varchar | 255 | |
| | DateModified | datetime | 8 | |
| | ModifiedBy | varchar | 255 | |

TABLE XV

Authoring System Database (ASDATA) Dictionary
Occasions - Stores Occasion Names and notes seasonal or everyday distinction

| | | | | |
|---|---|---|---|---|
| PK | RecordNumber | int | 4 | Unique number, never reused (RecordNumbers/ Occasions) |
| | Text | varchar | 255 | Occasion Description |

TABLE XV-continued

Authoring System Database (ASDATA) Dictionary
Occasions - Stores Occasion Names and notes seasonal or everyday distinction

| | | | |
|---|---|---|---|
| DateCreated | datetime | 8 | |
| CreatedBy | varchar | 255 | |
| DateModified | datetime | 8 | |
| ModifiedBy | varchar | 255 | |
| seasonal_everyday | char | 1 | Denotes whether seasonal or every day occasion (E or S) |

TABLE XVI

PaperTypes - Stores Paper Type Names and characteristics

| | | | | |
|---|---|---|---|---|
| PK | RecordNumber | int | 4 | Unique number, never reused (RecordNumbers/ DesignElements) |
| | Text | varchar | 255 | Paper Type Description |
| | PaperType | int | 4 | Paper Type (sheet, envelope, etc) |
| | Width | real | 4 | Paper Width |
| | Height | real | 4 | Paper Height |
| | DateCreated | datetime | 8 | |
| | CreatedBy | varchar | 50 | |
| | DateModified | datetime | 8 | |
| | ModifiedBy | varchar | 50 | |

TABLE XVII

Authoring System Database (ASDATA) Dictionary
Printers - Stores Printer Names, Driver Names, Alternate Printer Keys, and Paper Types Used

| | | | | |
|---|---|---|---|---|
| PK | RecordNumber | int | 4 | Unique number, never reused (RecordNumbers/ DesignElements) |
| | Text | varchar | 255 | Printer Description |
| FK | PaperTypes | image | 16 | Array of Paper Types allowed |
| FK | AlternatePrinters | image | 16 | Array of Alternate Printers (Keys back to this table) |
| | DeviceName | varchar | 255 | Windows Print Device Name |
| | DriverName | varchar | 255 | Windows Print Driver Name |
| | DateCreated | datetime | 8 | |
| | CreatedBy | varchar | 50 | |
| | DateModified | datetime | 8 | |
| | ModifiedBy | varchar | 50 | |

TABLE XVIII

Authoring System Database (ASDATA) Dictionary
ProductData - Store Product Information

| | | | | |
|---|---|---|---|---|
| PK | RecordNumber | int | 4 | Unique ProductNumber, never reused (Record-Numbers/ProductData) |
| | Rating | real | 4 | Product Rating |
| FK | CopyNumber | int | 4 | Foreign Key to |
| FK | CopyVersion | int | 4 | Copy table |
| FK | DesignNumber | int | 4 | Foreign Key to |
| FK | DesignVersion | int | 4 | Design table |
| | Archive1 | image | 16 | Archive of template information |
| | Archive2 | image | 16 | Archive of layout data, instuctions for putting the product together from the specified copy and |

TABLE XVIII-continued

Authoring System Database (ASDATA) Dictionary
ProductData - Store Product Information

| | | | | |
|---|---|---|---|---|
| FK | Countries | image | 16 | Array of Foreign Key to Countries table - Controls country visibility |
| FK | Languages | image | 16 | Array of Foreign Key to Languages table - Controls language visibility |
| FK | DefaultLanguage | int | 4 | Foreign Key to Language table - base llanguage of product |
| FK | Markets | image | 16 | Array of Foreign Key to Markets table - Controls market visibility |
| FK | Stock | int | 4 | Foreign Key to PaperType table |
| FK | Printer | int | 4 | Foreign Key to Printer table |
| FK | Associate | int | 4 | Foreign Key to ProductData table (i.e. associating an RSVP to an Invitation) |
| FK | License | int | 4 | Foreign Key to Licenses table |
| FK | Template | int | 4 | Foreign Key to Template table |
| | Activity | int | 4 | 0 = Active, 1 = Inactive |
| | ReworkCopy | int | 4 | 1 = Copy to be rework |
| | ReworkDesign | int | 4 | 1 = Design to be rework |
| | ReworkAttributes | int | 4 | 1 = Layout to be rework |
| | Description | varchar | 255 | Product Description |
| | AssociatedDescription | varchar | 255 | Associated Product Description |
| | DateCreated | datetime | 8 | |
| | CreatedBy | varchar | 50 | |
| | DateModified | datetime | 8 | |
| | ModifiedBy | varchar | 50 | |
| | TierLevel | int | 4 | Controls tier visibility |

TABLE XIX

Authoring System Database (ASDATA) Dictionary
Products - Stores Product Names

| | | | | |
|---|---|---|---|---|
| PK | RecordNumber | int | 4 | Unique number, never reused (RecordNumbers/ Products) |
| | Text | varchar | 255 | Product Description |
| | DateCreated | datetime | 8 | |
| | CreatedBy | varchar | 255 | |
| | DateModified | datetime | 8 | |
| | ModifiedBy | varchar | 255 | |

TABLE XX

Authoring System Database (ASDATA) Dictionary
Profiles - Stores unique Unit Profile information

| | | | | |
|---|---|---|---|---|
| PK | RecordNumber | int | 4 | Unique number, never reused (RecordNumbers/ Profiles) |
| K | SerialNumber | varchar | 255 | Unit Number ('AA999999' format) |
| | StoreName | varchar | 255 | |
| | Address | varchar | 255 | |
| | City | varchar | 255 | |
| | State | varchar | 255 | |
| | Country | varchar | 255 | |

TABLE XX-continued

Authoring System Database (ASDATA) Dictionary
Profiles - Stores unique Unit Profile information

| | | | |
|---|---|---|---|
| Zip | varchar | 255 | |
| Phone | varchar | 255 | |
| DefaultCountry | int | 4 | Kiosk's Default Country |
| DefaultLanguage | int | 4 | Kiosk's Default Language |
| Countries | image | 16 | Array of Kiosk's available Countries |
| Languages | image | 16 | Array of Kiosk's available Languages |
| Products | image | 16 | Array of Kiosk's available Products |
| Market | int | 4 | Kiosk's Market designation |
| Contact | varchar | 255 | |
| MarketingScreen1 | varchar | 255 | Path to special substitute marketing screens (same name as original) |
| CustomText | varchar | 255 | Text for back of product |
| DateCreated | datetime | 8 | |
| CreatedBy | varchar | 50 | |
| DateModified | datetime | 8 | |
| ModifiedBy | varchar | 50 | |
| CashPrice | float | 8 | Vending Price for cash units |
| CreditPrice | float | 8 | Vending Price for credit card units |
| CashReceipt | int | 4 | 0 = Always, 1 = Never, 2 = Optional |
| CreditReceipt | int | 4 | 0 = Always, 1 = Never, 2 = Optional |
| TierLevel | int | 4 | Unit's censorship tier level |

TABLE XXI

RecordNumbers - Stores current values for incremented numbers throughout the system

| | | | | |
|---|---|---|---|---|
| PK | TableName | varchar | 50 | Table or field name |
| | CurrentRecord | int | 4 | Last used number |

TABLE XXII

Styles - Stores Line List Style Names

| | | | | |
|---|---|---|---|---|
| PK | RecordNumber | int | 4 | Unique number, never reused (RecordNumbers/ Styles) |
| | Text | varchar | 255 | Style Description |
| | DateCreated | datetime | 8 | |
| | CreatedBy | varchar | 255 | |
| | DateModified | datetime | 8 | |
| | ModifiedBy | varchar | 255 | |

TABLE XXIII

Authoring System Database(ASDATA) Dictionary
SubCategories - Stores Line List Sub-category 1,2,3,4 Names

| | | | | |
|---|---|---|---|---|
| PK | RecordNumber | int | 4 | Unique number, never reused (RecordNumbers/ SubCategories) |
| | Text | varchar | 255 | Sub-category Description |
| | DateCreated | datetime | 8 | |
| | CreatedBy | varchar | 255 | |
| | DateModified | datetime | 8 | |
| | ModifiedBy | varchar | 255 | |

XXIV

| | | | | |
|---|---|---|---|---|
| Templates - Stores Product Template data | | | | |
| PK | RecordNumber | int | 4 | Unique number, never reused (RecordNumbers/Template) |
| | PrintLandscape | int | 4 | Is this to be printed landscape? 0 = Yes, 1 = No |
| | ViewLandscape | int | 4 | Is this to be viewed landscape? 0 = Yes, 1 = No |
| | Duplex | int | 4 | Is this to be duplexed? 0 = Yes, 1 = No |
| | Name | varchar | 255 | Template Name |
| | Archive | varchar | 255 | Archive of fold line, mirror line, etc. data |
| | DateCreated | datetime | 8 | |
| | CreatedBy | varchar | 50 | |
| | DateModified | datetime | 8 | |
| | ModifiedBy | varchar | 50 | |
| | UnitsPerSheet | int | 4 | Quantity of items per printed page (i.e. Invitation = 3) |

What is claimed:

1. A computer-implemented interface development tool for use by an interface designer in creating an interface for customer interaction, wherein such interface is to be incorporated into a customer service system for presenting products or services to a customer for the customer to make a product or service selection if the customer so desires from the products or services presented as a result of the customer's interaction with the interface, such interface development tool comprising:

- a global elements maintainer for enabling the interface designer to specify and maintain global elements associated with the products or services to be presented to the customer and for storing the global elements specified and maintained by the global elements maintainer in a global elements storage area;
- a profile maintainer for developing a profile of the customer service system environment in which the interface is to operate and for storing the profile so developed in a profile storage area, wherein such profile maintainer under the direction of the interface designer interacts with the global elements storage area to select a set of profile elements from the global elements and further wherein the profile includes the set of profile elements so selected;
- a presentation planner for associating a set of presentation data with the products or services available for presentation to the customer and for storing the set of presentation data in a presentation data storage area, wherein the set of presentation data includes a subset of data that are selected from the global elements; and
- an interface developer for developing the interface, the interface comprising a set of one or more presentation frames operating in accordance with the profile associated with the customer service system environment within which the interface is designed to operate and in conjunction with one or more controls associated with the set of one or more presentation frames, such that when the interface is implemented on the customer service system, activation of one or more of the controls or a particular presentation frame will result in an event, wherein such event may include the activation of another control or presentation frame or display to the customer of presentation data, and wherein at least one control may dynamically change in response to the profile or in response to interaction with the customer.

2. The computer implemented interface development tool according to claim 1, wherein the customer service system is a point-of-sale or point-of-preview kiosk.

3. The computer implemented interface development tool according to claim 1, wherein the customer service system is an in-home interactive system.

4. The computer implemented interface development tool according to claim 1, wherein the presentation planner further comprises a production planner for enabling production of customer products in accordance with results from a customer's interaction with the interface and at a location proximate to the customer service system within which the interface is to be incorporated.

5. The computer implemented interface development tool according to claim 4, wherein the customer products include greeting cards.

6. The computer implemented interface development tool according to claim 5, wherein the customer products include posters.

7. The computer implemented system interface development tool according to claim 6, wherein the customer products include social occasion announcements.

8. The computer implemented interface development tool according to claim 1, wherein the customer service environment includes a touch screen upon which the interface is displayed and through which a customer indicates product or service preferences.

9. The computer implemented interface development tool according to claim 8, wherein at least one control is a button located on the touch screen that when depressed by a customer will dynamically change the interface from one language to another.

10. The computer implemented interface development tool according to claim 9, wherein at least one control is a button located on the touch screen that when depressed by a customer results in a change in a presentation of the products or services.

11. The computer implemented system interface development tool according to claim 10, wherein the change in the presentation reflects an interaction of information conveyed by the customer through the touch screen with the profile.

12. A computer-implemented process for creating an interface for customer interaction, wherein such interface is to be incorporated into a customer service system for presenting products or services to a customer for the customer to make a product or service selection if the customer so desires from the products or services presented as a result of the customer's interaction with the interface, such process comprising the steps of:

- specifying and maintaining global elements associated with the products or services to be presented to the customer;
- storing the global elements in a global elements storage area;
- developing a profile of the customer service system environment in which the interface is to operate;
- storing the profile so developed in a profile storage area;
- associating a set of presentation data with the products or services available for presentation to the customer;
- storing the set of presentation data in a presentation data storage area; and
- developing an interface comprising a set of one or more presentation frames having one or more controls operating in accordance with the profile such that when the interface is implemented on the customer service system, activation of one or more of the controls or a particular presentation frame will result in an event, wherein such event may include the activation of another control or presentation frame or display to the customer of presentation data, and wherein at least one control may dynamically change in response to the profile or in response to interaction with the customer.

13. An interface produced by the process according to claim 12, wherein the products or services comprises products and services relating to the greeting card industry.

14. An interface produced by the process according to claim 12, wherein the interface is designed to be incorporated as part of a customer service kiosk.

15. A computer-implemented customer service system for enabling a customer to select a product or service for preview or purchase, the customer service system comprising:

a memory for storing product data and system profile data;

a processor for configuring the customer service system in accordance with the system profile data;

an interface for developing an interface comprising a set of one or more presentation frames having one or more controls operating in accordance with the profile such that when the interface is implemented on the customer service system, activation of one or more of the controls or a particular presentation frame will result in an event, wherein such event may include the activation of another control or presentation frame or display to the customer of presentation data, and wherein at least one control may dynamically change in response to the profile or in response to interaction with the customer;

a display for presenting the interface; and an input device for allowing a customer to generate customer inputs, where appropriate, to at least one control displayed within the interface.

* * * * *